(12) United States Patent
Sugahara et al.

(10) Patent No.: US 8,131,135 B2
(45) Date of Patent: Mar. 6, 2012

(54) MPEG PICTURE DATA RECORDING APPARATUS, MPEG PICTURE DATA RECORDING METHOD, MPEG PICTURE DATA RECORDING MEDIUM, MPEG PICTURE DATA GENERATING APPARATUS, MPEG PICTURE DATA REPRODUCING APPARATUS, AND MPEG PICTURE DATA REPRODUCING METHOD

(75) Inventors: Takayuki Sugahara, Kanagawa-ken (JP); Seiji Higurashi, Tokyo (JP); Toshio Kuroiwa, Kanagawa-ken (JP); Wataru Inoha, Kanagawa-ken (JP); Kenjiro Ueda, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 1211 days.

(21) Appl. No.: 11/898,251

(22) Filed: Sep. 11, 2007

(65) Prior Publication Data

US 2008/0044156 A1 Feb. 21, 2008

Related U.S. Application Data

(63) Continuation of application No. 09/961,298, filed on Sep. 25, 2001, now Pat. No. 7,292,782.

(30) Foreign Application Priority Data

Sep. 27, 2000 (JP) ................................ P2000-293737
Sep. 27, 2000 (JP) ................................ P2000-293738
May 30, 2001 (JP) ................................ P2001-162343

(51) Int. Cl.
*H04N 5/917* (2006.01)

(52) U.S. Cl. ........................................ 386/353; 386/356

(58) Field of Classification Search .................. 386/326, 386/328, 329, 353, 355, 356
See application file for complete search history.

(56) References Cited

U.S. PATENT DOCUMENTS 5,377,051 A * 12/1994 Lane et al. .................... 386/314
* cited by examiner

*Primary Examiner* — Robert Chevalier
(74) *Attorney, Agent, or Firm* — The Nath Law Group; Jerald L. Meyer; Stanley N. Protigal

(57) ABSTRACT

Executes a re-encoding after decoding data of a connection section A of a first MPEG picture data. This re-encoding is executed based on a control such that a transition of a VBV buffer occupation value starts from a VBV buffer occupation value at a position a and ends with a VBV buffer occupation value at a position d. Up to the position a of the first MPEG picture data, the first MPEG picture data is reproduced. Next, re-encoded MPEG picture data of the connection section A is reproduced. Thereafter, the data is connected to the position d of a second MPEG picture data, and the second MPEG picture data of the position d and after is reproduced.

1 Claim, 12 Drawing Sheets

MPEG PICTURE DATA RECORDING APPARATUS, MPEG PICTURE DATA RECORDING METHOD, MPEG PICTURE DATA RECORDING MEDIUM, MPEG PICTURE DATA GENERATING APPARATUS, MPEG PICTURE DATA REPRODUCING APPARATUS, AND MPEG PICTURE DATA REPRODUCING METHOD

This is a Continuation application of U.S. patent application from Ser. No. 09/961,298, filed Sep. 25, 2001, now U.S. Pat. No. 7,292,782 the contents of which are hereby incorporated by reference in its entirety.

BACKGROUND OF THE INVENTION

1. Field of the Invention

The present invention relates to an MPEG picture data recording apparatus, an MPEG picture data recording method, an MPEG picture data recording medium, an MPEG picture data generating apparatus, an MPEG picture data reproducing apparatus, and an MPEG picture data reproducing method for realizing a seamless connection of a first MPEG picture data and a second MPEG picture data that are image data encoded by the MPEG encoding system, at the time of connecting the first MPEG picture data to the second MPEG picture data at a connection point specified in the respective MPEG picture data and for reproducing the connected MPEG picture data.

2. Description of the Related Art

The MPEG as a conventional technique to be used in the present invention will be briefly explained below.

As the MPEG has been explained in detail in the ISO-IEC11172-2, the ITU-T H.262/ISO-IEC13818-2, only the outline will be explained below. The MPEG is an abbreviation of the Moving Picture Experts Group that is the name of an organization for studying the moving picture encoding standard established in the ISO/IEC JTC1/SC2 (International Standard Organization/International Electrotechnical Commission Joint Technical Committee 1/Specialized Committee 2, the current SC29), in 1988. The MPEG1 (MPEG phase 1) is a standard of an accumulation media of about 1.5 Mbps, into which a new technique has been introduced by taking over the JPEG that aims at the encoding of stationary images, and the basic technique of H.261 (the CCITT SGXV, standardized in the current ITU-T SG15) that aims at the compression of moving pictures for a low transfer rate of the ISDN television meetings and television telephones. The MPEG1 has been established as the ISO/IEC 11172 in August 1993.

The MPEG1 is prepared by combining several techniques. FIG. 1 shows a conventional MPEG encoder for carrying out the encoding according to the MPEG encoding system. This will be briefly explained below.

A differential unit 2 is input with a straight input image and an image prepared by decoding this input image by a motion compensation predicting unit 1. The differential unit 2 subtracts the image decoded by the motion compensation predicting unit 1 from the straight input image, thereby to delete a time redundancy portion.

As the method of prediction, there are three modes, as fundamental modes, i.e., a mode in which prediction is performed from past picture images, a mode in which prediction is performed from future picture images, and a mode in which prediction is performed from both past picture images and future picture images. Also, each of these modes can be used by being switched in units of a macroblock (MB) composed of 16 pixels×16 pixels. The direction of prediction is determined according to the picture type that has been imparted to an input picture image. As the picture types, there are a one-directional between-picture prediction encoded picture image (P-picture), bi-directional between-picture prediction encoded picture image (B-picture), and intra-picture independently encoded picture image (I-picture). In the P-picture type (one-directional between-picture prediction encoded picture image), there are two modes one of which is to encode by performing prediction from past picture images and the other of which is to independently encode a macroblock without performing relevant prediction. In the B-picture (bi-directional between-picture prediction encoded picture image), there are four modes, a first one of which is to perform prediction from future picture images, a second one of which is to perform prediction from past picture images, a third one of which is to perform prediction from both past picture images and future picture images, and a fourth one of which is to encode independently without performing any prediction. In the I-picture (intra-picture independently encoded picture image), all macroblocks are each independently encoded.

In the motion compensation, by performing pattern matching of the movement regions in units of a macroblock, a motion vector is detected with a half pixel precision, and prediction is made after shifting of the macroblock to an extent corresponding to the thus-detected motion vector. The motion vector includes horizontal and vertical motion vectors, and this motion vector is transmitted as additional messages for macroblock along with an MC (Motion Compensation) mode that indicates where prediction is made from.

In general, the pictures from the I-picture to a picture that immediately precedes the next I-picture are called "GOP (group Of Pictures)". In a case where pictures are used in accumulation media or the like, approximately 15 pictures or so are generally used as 1 GOP. (However, two or more I pictures may be included within one GOP section. In short, one or more I picture may be included within one GOP section.)

In a DCT unit 3, a differential picture image signal that has been supplied is subjected to orthogonal transformation. Here, the DCT (Discrete Cosine Transform) means an orthogonal transformation through which an integrating transformation that uses a cosine function as an integrating kernel is changed to a discrete transformation that is made into a finite space. In the MPEG, two-dimensional DCT is preformed of 8×8 DCT blocks that have been obtained by dividing the macroblock into four parts. It is to be noted that in general a video signal is composed of a large amount of low frequency band components and a lesser amount of high frequency band components and that, therefore, when performing DCT, the coefficients thereof are concentratedly gathered into the low band.

In a quantizing unit 4, quantization is performed of the discrete-cosine transformed picture data (DCT coefficients). In the quantization performed in this quantizing unit 4, a two-dimensional frequency of 8×8, which constitutes a quantizing matrix is weighted by visual characteristics. The value that has been resultantly obtained is further made scalar-fold by a quantizing scale. And using the thus-obtained value as a quantizing value, the DCT coefficient is divided by this value. When the quantization is performed by an MPEG decoder (decoder), encoded data is multiplied with the quantizing value. As a result, it is possible to obtain a value that is approximate to the original DCT coefficient.

A VLC 5 performs variable length coding on the quantized data. In this VLC 5, of the quantized values, with respect to direct current (DC) components, coding is performed using DPCM (differential pulse code modulation) that is one of the prediction coding techniques. On the other hand, with respect to alternating current (AC) components, so-called "Huffman coding" is performed in which so-called "zigzag scan" is performed from a low band to a high band and, by counting the run length and effective coefficient value of a zero as being one piece of significant event, a code having a shorter code length is allotted to the data sequentially from one, the probability of which occurrence is higher.

A buffer memory 6 temporarily stores therein the variable length coded data, and produces an output as encoded data at a predetermined transfer rate. The amount of codes generated in macroblock units is transmitted to an amount-of-code controlling unit 21. The amount-of-code controlling unit 21 determines an error amount of code that is the difference between the amount-of-code generated and a target amount of code in macroblock units, and produces an amount-of-code control signal that corresponds to the error amount-of-code and thereby feeds it back to the quantizing unit 4, thereby performing control of the amount-of-code generated by adjusting the quantizing scale.

The quantized picture data is inversely quantized by an inverse quantizing unit 7, and is then inversely discrete-cosine transformed by an inverse DCT unit 8. The data is then temporarily stored in a picture memory 10 via an adder 9. After that, the data is used in the motion compensation predicting unit 1 as a reference decoding picture for calculating a differential picture.

FIG. 2 shows an MPEG decoder (decoder) for decoding the MPEG encoded data.

An input encoded data (stream) is buffered by a buffer 11. A data from the buffer 11 is input to a VLD 12. The VLD 12 performs a variable length decoding, and obtains a DC component and an AC component. The AC component data is disposed in matrix of 8×8 in the sequence of zigzag scan from a low area to a high area. The data is input to an inverse quantizing unit 13, and is inversely quantized there in a quantization matrix. The inversely quantized data is input to an inverse DCT 14, and is inversely discrete-cosine transformed there. The result is output as a picture data (decoded data). The decoded data is temporarily stored in a picture memory 16. After that, a motion compensation predicting unit 17 uses this data as reference decoding picture for calculating a differential picture.

The encoded bit stream has an amount of code in a variable length for each one picture in the case of a video. This is because the MPEG uses information conversion like DCT, quantization, and Huffman coding, and it is necessary to suitably change the amount of code to be allocated to each picture for improving the picture quality. Further, as the motion compensation prediction is carried out, it is necessary to encode the input picture as it is, and to encode the differential picture as a differential of prediction pictures in some case. Thus, the entropy of the encoded picture itself changes to a large extent.

In this case, the amount of code is controlled by distributing it based on the entropy rate of the picture while limiting the buffer in most cases. A buffer managing unit monitors the relationship between the generated amount of code and encoding rate, and sets a target amount of code such that it is accommodated within a predetermined buffer. This value is fed back to the variable length encoder, and is input to the amount-of-code controlling unit. The amount-of-code controlling unit restricts the generated amount of code by increasing the quantized value to be set to the quantizing unit, and makes small the generated amount of code by decreasing the quantized value.

In the case of encoding the variable length data at a fixed transfer rate (encoding rate), it has been prescribed in the MPEG to use a model in which when a predetermined value of data has been accumulated after the input of the data at a constant rate, the decoding of the data is executed momentarily at a predetermined time (in the unit of 1/29.97 in the case of the video signal of the NTSC), and the encoding is executed such that the buffer does not generate either an overflow or an underflow. So long as this prescription (the VBV buffer prescription) is kept, the data is transferred at a fixed transfer rate when the observation time is taken long, although the data transfer rate within the VBV buffer changes locally. In the MPEG, this is defined as a fixed rate.

In the case of the fixed transfer rate, the buffer-occupied amount is fixed to a maximum buffer amount of the decoder as an upper limit value, when the generated amount of code is small. In this case, it is necessary to increase the amount of code by adding invalid bits so as not to cause an overflow.

When the data is transferred at a variable transfer rate, the definition of the fixed transfer rate is expanded. It has been defined that when the buffer occupation rate has reached the upper limit value, the reading of the decoder is stopped, thereby to avoid the generation of an overflow in principle. FIG. 3 shows a transition of the buffer. Even when the generated amount of code is very small, the reading of the decoder is stopped. Therefore, it is not necessary to add the invalid bits like in the case of the fixed transfer rate. Accordingly, encoding is performed so as not to cause only an underflow.

The MPEG prescribes a system in which bit streams encoded by the MPEG video or audio are multiplexed into one bit stream, and the data is reproduced while securing the synchronization. The contents prescribed in the system are broadly classified into the following five points.

1) Synchronous reproduction of a plurality of encoded bit streams
2) Multiplexing of a plurality of encoded bit streams into a single bit steam
3) Initialization of a buffer at the time of starting a reproduction
4) Management of continuous buffers
5) Firming up of a time for decoding or reproduction In order to execute a multiplexing in the MPEG, it is necessary to packet the information. The multiplexing based on packets is a system in which, when a video or audio data is to be multiplexed, for example, each data is divided into streams called packets each having a suitable length, a header including additional information is added to each packet, and the packets are transmitted in time division by suitably switching the packets of the video or audio data. The header includes information for identifying video or audio data, and time information for synchronization. The packet length depends on a transmission medium or application, and has a length from 53 bytes for the ATM to long 4 k bytes for an optical disk. In the MPEG, it is possible to optionally assign a variable packet length.

The data is packed and is divided into packets, and one pack is composed of a few packets. The header portion of each pack is described with a pack start code and SCR (System Clock Reference), and the header portion of the packet is described with a stream id and a time stamp. The time stamp is described with time information for synchronizing audio or video data, and has two kinds of DTS (Decoding Time Stamp) and PTS (Presentation Time Stamp). PCR (Program Clock Reference) is described in the time precision of 27 MHz, and this is the information for locking a reference clock of the decoder. The DTS shows a decode starting time of the first access unit within the packet data (one picture in the case of the video, and 1152 samples, for example, in the case of the audio). The PTS shows a display (reproduction) starting time of this. As shown in FIG. 4, an audio decoder, a video decoder, and other decoders always monitor a common reference clock locked in the PCR, and execute decoding or display when the time coincides with the time of the DTS or the PTS. A multiplexed data is buffered by each decoder. A virtual decoder for executing a synchronous display is called an STD (System Target Decoder). The multiplication must be performed so as not to allow the STD to cause an overflow or an underflow.

In the MPEG, there exist broadly two types of TS (Transport Stream) and PS (Program Stream). These streams are composed of PES (Packetized Elementary Stream) and packets including other necessary information. The PES is prescribed as an intermediate stream for making it possible to transform between both streams. The PES is a packetized stream of a private stream in addition to the video and audio data encoded by the MPEG.

The PS can multiplex video and audio data of a program having a common reference time. A packet layer is called PES, and this structure is commonly used with TS to be described later as shown in FIG. 5, and makes it possible to achieve mutual compatibility. In the STD model of the PS, the stream is switched by the stream id within the PES packet.

The TS can also multiplex video and audio data of a program having a common reference time, like the PS. The TS can further make it possible to multiplex a multiprogram for communications and broadcasting having different reference times. The TS is constructed of fixed length packets of 188 bytes by taking into account an ATM cell length and error correction encoding. The TS can be used in a system having an error. The structure of the TS packet itself is not so complex. However, because of the multiprogram steam, the application of the TS packet is complex. The TS packet is different from the PS packet in that while the TS packet is in the high-level structure, the TS packet is (usually) shorter than the PES packet, and the PES packet is divided and transferred by mounting it on the TS packet. In the STD model of the TS, the stream is switched based on PID (packet ID) within the TS packet.

The TS of the MPEG is designed to indicate a PID to which a packet relating to the information on a multiplexed program belongs. This will be explained with reference to FIG. 6. First, a packet of PID=0 is searched for in the TS packets. This is an information packet called PAT (Program Association Table). Within this packet, there is described information PID corresponding to the program number PR in a linked format. Next, a PID packet corresponding to a target PR is searched for. Then, there is an information packet called PMT (Program Map Table). In this packet, there are described information of the PID of the video packet and the PID of the audio packet of the program corresponding to this PR.

The PAT and the PMT are called PSI (Program Specific Information). There is provided an information system which makes it possible to access (enter) a channel of a target program.

According to the invention disclosed in Japanese Patent Application Laid-open Publication No. 11-74799, there is disclosed a method of carrying out an encoding by taking into account the continuity. According to this conventional method, in the case of editing compressed data like MPEG picture data recorded on a recording medium, in order to keep the continuity of the MPEG picture data, the generated amount of code is controlled such that the VBV buffer becomes always constant at the editing time, and the GOP is encoded as a closed GOP.

Further, according to the invention disclosed in Japanese Patent Application Laid-open Publication No. 11-187354, there is disclosed a method that no constraint is provided in an encoded data, and information showing data extracted as an editing element and information relating to a sequence of reproducing this are described in a partial section of this data, thereby to realize an editing of pictures on a single recording medium without changing the recorded data.

However, according to the above conventional systems, a simple connection of the MPEG picture data generates a contradiction in the connection of the VBV buffers, resulting in an overflow or an underflow of the data. In the case of the fixed length encoding, the value of the VBV is described for each picture, and it has been possible to calculate a starting value of the VBV at a starting point of an additional recording, by observing the picture bit streams. However, it has been necessary to decode a part of the data into MPEG compressed data. Further, in the case of the variable length encoding, the value of the VBV is not described in the syntax at all. Therefore, it has been necessary to calculate the starting value by observing the generated amount of code of each picture from the header of the compressed data. This has required more circuits and more calculation time.

According to the invention disclosed in Japanese Patent Application Laid-open Publication No. 11-74799, the encoding constraint is provided by taking into account the continuity, such as the generated amount of code is controlled such that the VBV buffer becomes always constant for each GOP, and the GOP is encoded as a closed GOP, in order to keep the continuity of the MPEG picture data. This has been disadvantageous in the aspect of encoding efficiency.

Further, according to the invention disclosed in Japanese Patent Application Laid-open Publication No. 11-187354, the reproduction is displayed as if the editing has been performed. However, the continuity at the editing point is not complete. As a result, there has been a possibility that a temporary stationary phenomenon occurs due to the initialization of the data buffer of the MPEG picture data.

SUMMARY OF THE INVENTION

It is an object of the present invention to provide an MPEG picture data recording apparatus, an MPEG picture data recording method, an MPEG picture data reproducing apparatus, an MPEG picture data reproducing method, and a recording medium capable of reproducing seamless MPEG picture data when a new MPEG picture data is additionally recorded in the middle or at the end of an MPEG picture data that has already been recorded, without generating a contradiction of an overflow or an underflow in the connection of VBV buffers during a reproduction time.

Further, it is another object of the invention to provide an MPEG picture data recording apparatus, an MPEG picture data recording method, and a recording medium capable of identifying a starting value of VBV at a starting point of an MPEG picture data that is to be additionally recorded, without a need for decoding an MPEG picture data that has already been recorded, and capable of reducing a size of a circuit scale and reducing a calculation time.

Further, it is still another object of the invention to provide an MPEG picture data recording apparatus, an MPEG picture data recording method, an MPEG picture data generating apparatus, an MPEG picture data reproducing apparatus, and an MPEG picture data reproducing method capable of reproducing seamless and high-definition MPEG picture data when two MPEG picture data of a first MPEG picture data and a second MPEG picture data (or a packet-multiplexed first MPEG multiplexed data including a first MPEG picture data as an element encoded data, and a packet-multiplexed second MPEG multiplexed data including a second MPEG picture data as an element encoded data) are reproduced by connecting the first MPEG picture data to the second MPEG picture data (or by connecting the first MPEG multiplexed data to the second MPEG multiplexed data) at respective specified connection positions, without generating a contradiction of an overflow or an underflow in the connection of VBV buffers during a reproduction time.

Further, it is still another object of the invention to provide an MPEG picture data recording apparatus, and an MPEG picture data generating apparatus capable of obtaining a starting value and an end value of an information value relating to a value of occupation of the VBV buffer at the time of generating a connection section re-encoded data without requiring a decoding of two MPEG picture data of a first MPEG picture data and a second MPEG picture data, and capable of reducing a size of a circuit scale and reducing a calculation time.

To achieve the above objects, there is provided an MPEG picture data recording apparatus for recording an MPEG picture data that is a picture data compressed according to an MPEG encoding system, the MPEG picture data recording apparatus comprising: recording means for recording the MPEG picture data onto a recording medium together with information that shows a VBV buffer occupation value at an end point in time of encoding of a picture one frame before an I picture, information that shows a VBV buffer occupation value at an end point in time of encoding of a picture one frame before a P picture, and information that shows a VBV buffer occupation value at an end point in time of recording, in a bit stream of the MPEG picture data respectively, and address information that shows a point of time of the MPEG picture data each VBV buffer occupation value belongs to.

To achieve the above objects, there is provided an MPEG picture data recording apparatus for recording an MPEG picture data that is a picture data compressed according to an MPEG encoding system, wherein in the case of additionally recording a second MPEG picture data at an end position of a first MPEG picture data or at an intermediate position of the first MPEG picture data, onto a recording medium that has already been recorded with the first MPEG picture data, together with information that shows a VBV buffer occupation value at an end point in time of encoding of a picture one frame before an I picture, information that shows a VBV buffer occupation value at an end point in time of encoding of a picture one frame before a P picture, and information that shows a VBV buffer occupation value at an end point in time of recording, in a bit stream of the first MPEG picture data respectively, and address information that shows a point of time of the first MPEG picture data each VBV buffer occupation value belongs to, the MPEG picture data recording apparatus comprises: detecting means for detecting information that shows the VBV buffer occupation value corresponding to a position nearest to the position of starting the additional recording of the second MPEG picture data in the first MPEG picture data, based on the address information; encoding means for executing an MPEG encoding of the second picture data and obtaining the second MPEG picture data, while starting a VBV buffer control based on the detected information that shows the VBV buffer occupation value; and recording means for recording the second MPEG picture data onto the recording medium.

To achieve the above objects, there is provided an MPEG picture data recording method for recording an MPEG picture data that is a picture data compressed according to an MPEG encoding system, the MPEG picture data recording method comprising the steps of: generating information that shows a VBV buffer occupation value at an end point in time of encoding of a picture one frame before an I picture, information that shows a VBV buffer occupation value at an end point in time of encoding of a picture one frame before a P picture, and information that shows a VBV buffer occupation value at an end point in time of recording, in a bit stream of the MPEG picture data respectively; generating address information that shows a point of time of the MPEG picture data each VBV buffer occupation value belongs to; and recording the information that shows each VBV buffer occupation value, and the address information onto a recording medium together with the MPEG picture data.

To achieve the above objects, there is provided an MPEG picture data recording method for recording an MPEG picture data that is a picture data compressed according to an MPEG encoding system, wherein in the case of additionally recording a second MPEG picture data at an end position of a first MPEG picture data or at an intermediate position of the first MPEG picture data, onto a recording medium that has already been recorded with the first MPEG picture data, together with information that shows a VBV buffer occupation value at an end point in time of encoding of a picture one frame before an I picture, information that shows a VBV buffer occupation value at an end point in time of encoding of a picture one frame before a P picture, and information that shows a VBV buffer occupation value at an end point in time of recording, in a bit stream of the first MPEG picture data respectively, and address information that shows a point of time of the first MPEG picture data each VBV buffer occupation value belongs to, the MPEG picture data recording method comprises the steps of: detecting information that shows the VBV buffer occupation value corresponding to a position nearest to the position of starting the additional recording of the second MPEG picture data in the first MPEG picture data, based on the address information; executing an MPEG encoding of the second picture data and obtaining the second MPEG picture data, while starting a VBV buffer control based on the detected information that shows the VBV buffer occupation value; and recording the second MPEG picture data onto the recording medium.

To achieve the above objects, there is provided a recording medium that is recorded with an MPEG picture data as a picture data compressed according to an MPEG encoding system, together with information that shows a VBV buffer occupation value at an end point in time of encoding of a picture one frame before an I picture, information that shows a VBV buffer occupation value at an end point in time of encoding of a picture one frame before a P picture, and information that shows a VBV buffer occupation value at an end point in time of recording, in a bit stream of the MPEG picture data respectively, and address information that shows a point of time of the MPEG picture data each VBV buffer occupation value belongs to.

To achieve the above objects, there is provided an MPEG picture data recording apparatus for recording an MPEG picture data that is a picture data encoded according to an MPEG encoding system, the MPEG picture data recording apparatus comprising: VBV buffer information recording means for recording onto a recording medium, VBV buffer occupation value relevant information that shows an information value relating to a VBV buffer occupation value at an MPEG encoding starting point in time or an end point in time of a last picture in each predetermined section of the MPEG picture data, and address information that shows a position of the VBV buffer occupation value relevant information in the MPEG picture data.

To achieve the above objects, there is provided an MPEG picture data recording apparatus comprising recording means for recording a generated connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording means comprises: detecting means for detecting the first VBV buffer occupation value relevant information corresponding to a starting position of a connection section based on the first address information, and detecting the second VBV buffer occupation value relevant information corresponding to the specified connection position in the second MPEG picture data based on the second address information, with the specified connection position specified as a boundary of the second predetermined section in at least the second MPEG picture data, wherein the connection section is a section from a boundary of the first predetermined section located a predetermined time before the specified connection position in the first MPEG picture data as the starting position to the specified connection position in the first MPEG picture data as an end position; and re-encoding means for re-encoding the connection section decoded picture data as a picture data obtained by decoding the first MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, thereby recording the connection section re-encoded data onto a recording medium.

According to a preferred embodiment of the present invention, the recording means records a connection section MPEG multiplexed data that includes the connection section re-encoded data as an element encoded data and that has been generated by being packet-multiplexed according to the MPEG encoding system.

To achieve the above objects, there is provided an MPEG picture data recording apparatus comprising recording means for recording a generated connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording means comprises: detecting means for detecting the first VBV buffer occupation value relevant information corresponding to an specified connection position in the first MPEG picture data based on the first address information, and detecting the second VBV buffer occupation value relevant information corresponding to an end position of a connection section based on the second address information, with the specified connection position specified as a boundary of the first predetermined section in at least the first MPEG picture data, wherein the connection section is a section from the specified connection position in the second MPEG picture data as a starting position to a boundary of the second predetermined section located a predetermined time after the specified connection position in the second MPEG picture data as the end position; and re-encoding means for re-encoding the connection section decoded picture data as a picture data obtained by decoding the second MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, thereby recording the connection section re-encoded data onto a recording medium.

According to a preferred embodiment of the present invention, the recording means records a connection section MPEG multiplexed data that includes the connection section re-encoded data as an element encoded data and that has been generated by being packet-multiplexed according to the MPEG encoding system.

To achieve the above objects, there is provided an MPEG picture data recording apparatus comprising recording means for recording a generated third connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording means comprises: detecting means for detecting the first VBV buffer occupation value relevant information corresponding to a starting position of a first connection section based on the first address information, and detecting the second VBV buffer occupation value relevant information corresponding to an end position of a second connection section based on the second address information, wherein the first connection section is a section from a boundary of the first predetermined section located a first predetermined time before the specified connection position in the first MPEG picture data as the starting position to the specified connection position in the first MPEG picture data as an end position, and the second connection section is a section from the specified connection position in the second MPEG picture data to a boundary of the second predetermined section located a second predetermined time after the specified connection position in the second MPEG picture data as an end position; and re-encoding means for re-encoding a third connection section decoded picture data according to the MPEG encoding system thereby to obtain a third connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, wherein the third connection section is a section obtained by combining the first connection sect ion and the second connection section together, and the third connection section decoded picture data consists of a first connection section decoded picture data as a picture data obtained by decoding the first MPEG picture data in the first connection section, and a second connection section decoded picture data as a picture data obtained by decoding the second MPEG picture data in the second connection section, thereby recording the third connection section re-encoded data onto a recording medium.

According to a preferred embodiment of the present invention, the recording means records a connection section MPEG multiplexed data that includes the third connection section re-encoded data as an element encoded data and that has been generated by being packet-multiplexed according to the MPEG encoding system.

To achieve the above objects, there is provided an MPEG picture data recording apparatus for recording an MPEG multiplexed data that includes an MPEG picture data as a picture data encoded according to an MPEG encoding system as an element encoded data and that has been generated by being packet-multiplexed according to the MPEG encoding system, the MPEG picture data recording apparatus comprising: VBV buffer information recording means for recording onto a recording medium, VBV buffer occupation value relevant information that shows an information value relating to a VBV buffer occupation value at an MPEG encoding starting point in time or an end point in time of a last picture in each predetermined section of the MPEG picture data, and address information that shows a position of the VBV buffer occupation value relevant information in the MPEG picture data.

To achieve the above objects, there is provided an MPEG picture data recording medium that is recorded with two MPEG picture data of a first MPEG picture data and a second MPEG picture data as a picture data encoded according to an MPEG encoding system, and with a connection section re-encoded data encoded according to the MPEG encoding system as a data for reproducing the first MPEG picture data and the second MPEG picture data by connecting the first MPEG picture data to the second MPEG picture data at specified connection positions specified in the first and second MPEG picture data respectively, wherein the connection section re-encoded data is a re-encoded data generated by re-encoding a connection section decoded picture data as a picture data obtained by decoding the first MPEG picture data in a connection section, according to the MPEG encoding system, wherein the connection section is a section from a position located a predetermined time before the specified connection position in the first MPEG picture data as a starting position to the specified connection position in the first MPEG picture data as an end position, and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the starting position of the connection section and ends with the information value relating to the VBV buffer occupation value at the time of encoding the second MPEG picture data at a position corresponding to the specified connection position.

To achieve the above objects, there is provided an MPEG picture data recording medium that is recorded with two MPEG picture data of a first MPEG picture data and a second MPEG picture data as a picture data encoded according to an MPEG encoding system, and a connection section re-encoded data encoded according to the MPEG encoding system as a data for reproducing the first MPEG picture data and the second MPEG picture data by connecting the first MPEG picture data to the second MPEG picture data at specified connection positions specified in the first and second MPEG picture data respectively, wherein the connection section re-encoded data is a re-encoded data generated by re-encoding a connection section decoded picture data as a picture data obtained by decoding the second MPEG picture data in a connection section, according to the MPEG encoding system, wherein the connection section is a section from the specified connection position in the second MPEG picture data as a starting position to a position located a predetermined time after the specified connection position in the second MPEG picture data as an end position, and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position and ends with the information value relating to the VBV buffer occupation value at the time of encoding the second MPEG picture data at a position corresponding to the end position of the connection section.

To achieve the above objects, there is provided an MPEG picture data recording medium that is recorded with two MPEG picture data of a first MPEG picture data and a second MPEG picture data as a picture data encoded according to an MPEG encoding system, and a third connection section re-encoded data encoded according to the MPEG encoding system as a data for reproducing the first MPEG picture data and the second MPEG picture data by connecting the first MPEG picture data to the second MPEG picture data at specified connection positions specified in the first and second MPEG picture data respectively, wherein the third connection section re-encoded data is an encoded data obtained by re-encoding a third connection section decoded picture data consisting of a first connection section decoded picture data as a picture data obtained by decoding the first MPEG picture data in a first connection section, and a second connection section decoded picture data as a picture data obtained by decoding the second MPEG picture data in the second connection section, wherein the first connection section is a section from a position located a first predetermined time before the specified connection position in the first MPEG picture data as a starting position to the specified connection position in the first MPEG picture data as an end position, the second connection section is a section from the specified connection position in the second MPEG picture data to a position located a second predetermined time after the specified connection position in the second MPEG picture data as an end position, and the third connection section is a section consisting of the first connection section and the second connection section; and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position and ends with the information value relating to the VBV buffer occupation value at the time of encoding the second MPEG picture data at a position corresponding to the end position of the connection section.

To achieve the above objects, there is provided an MPEG picture data recording medium recorded with a first MPEG multiplexed data that includes a first MPEG picture data as a picture data encoded according to an MPEG encoding system as an element encoded data and that has been generated by being packet multiplexed according to the MPEG encoding system, a second MPEG multiplexed data that includes a second MPEG picture data as a picture data encoded according to an MPEG encoding system as an element encoded data and that has been generated by being packet multiplexed according to the MPEG encoding system, and a connection section MPEG multiplexed data that includes a connection section re-encoded data as an element encoded data and that has been generated by being packet-multiplexed according to the MPEG encoding system, wherein the connection section re-encoded data is a data encoded according to the MPEG encoding system, for reproducing the first MPEG picture data and the second MPEG picture data by connecting the first MPEG picture data to the second MPEG picture data at specified connection positions specified in the respective MPEG picture data, wherein the connection section re-encoded data is a re-encoded data generated by re-encoding a connection section decoded picture data as a picture data obtained by decoding the first MPEG picture data in a connection section, according to the MPEG encoding system, wherein the connection section is a section from a position located a predetermined time before the specified connection position in the first MPEG picture data as a starting position to the specified connection position in the first MPEG picture data as an end position, and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the starting position of the connection section and ends with the information value relating to the VBV buffer occupation value at the time of encoding the second MPEG picture data at a position corresponding to the specified connection position.

To achieve the above objects, there is provided an MPEG picture data recording medium recorded with a first MPEG multiplexed data that includes a first MPEG picture data as a picture data encoded according to an MPEG encoding system as an element encoded data and that has been generated by being packet-multiplexed according to the MPEG encoding system, a second MPEG multiplexed data that includes a second MPEG picture data as a picture data encoded according to an MPEG encoding system as an element encoded data and that has been generated by being packet-multiplexed according to the MPEG encoding system, and a connection section MPEG multiplexed data that includes a connection section re-encoded data as an element encoded data and that has been generated by being packet-multiplexed according to the MPEG encoding system, wherein the connection section re-encoded data is a data encoded according to the MPEG encoding system, for reproducing the first MPEG picture data and the second MPEG picture data by connecting the first MPEG picture data to the second MPEG picture data at specified connection positions specified in the respective MPEG picture data, wherein the connection section re-encoded data is a re-encoded data generated by re-encoding a connection section decoded picture data as a picture data obtained by decoding the second MPEG picture data in a connection section, according to the MPEG encoding system, wherein the connection section is a section from the specified connection position in the second MPEG picture data as a starting position to a position located a predetermined time after the specified connection position in the second MPEG picture data as an end position, and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position and ends with the information value relating to the VBV buffer occupation value at the time of encoding the second MPEG picture data at a position corresponding to the end position of the connection section.

To achieve the above objects, there is provided an MPEG picture data recording medium recorded with a first MPEG multiplexed data that includes a first MPEG picture data as a picture data encoded according to an MPEG encoding system as an element encoded data and that has been generated by being packet-multiplexed according to the MPEG encoding system, a second MPEG multiplexed data that includes a second MPEG picture data as a picture data encoded according to an MPEG encoding system as an element encoded data and that has been generated by being packet-multiplexed according to the MPEG encoding system, and a third connection section MPEG multiplexed data that includes a third connection section re-encoded data as an element encoded data and that has been generated by being packet-multiplexed according to the MPEG encoding system, wherein the connection section re-encoded data is a data encoded according to the MPEG encoding system, for reproducing the first MPEG picture data and the second MPEG picture data by connecting the first MPEG picture data to the second MPEG picture data at specified connection positions specified in the respective MPEG picture data, wherein the third connection section re-encoded data is an encoded data obtained by re-encoding a third connection section decoded picture data consisting of a first connection section decoded picture data as a picture data obtained by decoding the first MPEG picture data in a first connection section, and a second connection section decoded picture data as a picture data obtained by decoding the second MPEG picture data in the second connection section, wherein the first connection section is a section from a position located a first predetermined time before the specified connection position in the first MPEG picture data as a starting position to the specified connection position in the first MPEG picture data as an end position, the second connection section is a section from the specified connection position in the second MPEG picture data to a position located a second predetermined time after the specified connection position in the second MPEG picture data as an end position, and the third connection section is a section consisting of the first connection section and the second connection section; and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position and ends with the information value relating to the VBV buffer occupation value at the time of encoding the second MPEG picture data at a position corresponding to the end position of the connection section.

To achieve the above objects, there is provided an MPEG picture data generating apparatus comprising generating means for generating a connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the generating means comprises: detecting means for detecting the first VBV buffer occupation value relevant information corresponding to a starting position of a connection section based on the first address information, and detecting the second VBV buffer occupation value relevant information corresponding to the specified connection position in the second MPEG picture data based on the second address information, with the specified connection position specified as a boundary of the second predetermined section in at least the second MPEG picture data, wherein the connection section is a section from a boundary of the first predetermined section located a predetermined time before the specified connection position in the first MPEG picture data as the starting position to the specified connection position in the first MPEG picture data as an end position; and re-encoding means for re-encoding the connection section decoded picture data as a picture data obtained by decoding the first MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information.

According to a preferred embodiment of the present invention, the generating means generates a connection section MPEG multiplexed data that includes the connection section re-encoded data as an element encoded data and that has been generated by being packet-multiplexed according to the MPEG encoding system.

To achieve the above objects, there is provided an MPEG picture data generating apparatus comprising generating means for generating a connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the generating means comprises: detecting means for detecting the first VBV buffer occupation value relevant information corresponding to an specified connection position in the first MPEG picture data based on the first address information, and detecting the second VBV buffer occupation value relevant information corresponding to an end position of a connection section based on the second address information, with the specified connection position specified as a boundary of the first predetermined section in at least the first MPEG picture data, wherein the connection section is a section from the specified connection position in the second MPEG picture data as a starting position to a boundary of the second predetermined section located a predetermined time after the specified connection position in the second MPEG picture data as the end position; and re-encoding means for re-encoding the connection section decoded picture data as a picture data obtained by decoding the second MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information.

According to a preferred embodiment of the present invention, the generating means generates a connection section MPEG multiplexed data that includes the connection section re-encoded data as an element encoded data and that has been generated by being packet-multiplexed according to the MPEG encoding system.

To achieve the above objects, there is provided an MPEG picture data generating apparatus comprising generating means for generating a third connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the generating means comprises: detecting means for detecting the first VBV buffer occupation value relevant information corresponding to a starting position of a first connection section based on the first address information, and detecting the second VBV buffer occupation value relevant information corresponding to an end position of a second connection section based on the second address information, wherein the first connection section is a section from a boundary of the first predetermined section located a first predetermined time before the specified connection position in the first MPEG picture data as the starting position to the specified connection position in the first MPEG picture data as an end position, and the second connection section is a section from the specified connection position in the second MPEG picture data to a boundary of the second predetermined section located a second predetermined time after the specified connection position in the second MPEG picture data as an end position; and re-encoding means for, re-encoding a third connection section decoded picture data according to the MPEG encoding system thereby to obtain a third connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, wherein the third connection section is a section obtained by combining the first connection section and the second connection section together, and the third connection section decoded picture data consists of a first connection section decoded picture data as a picture data obtained by decoding the first MPEG picture data in the first connection section, and a second connection section decoded picture data as a picture data obtained by decoding the second MPEG picture data in the second connection section.

According to a preferred embodiment of the present invention, the generating means generates a third connection section MPEG multiplexed data that includes the third connection section re-encoded data as an element encoded data and that has been generated by being packet-multiplexed according to the MPEG encoding system.

To achieve the above objects, there is provided an MPEG picture data recording method comprising the steps of: recording onto a recording medium, VBV buffer occupation value relevant information that shows an information value relating to a VBV buffer occupation value at an MPEG encoding starting point in time or an end point in time of a last picture in each predetermined section of an MPEG picture data that is a picture data encoded according to an MPEG encoding system, and address information that shows a position of the VBV buffer occupation value relevant information in the MPEG picture data.

According to a preferred embodiment of the present invention, the MPEG picture data is obtained from an MPEG multiplexed data that has been generated by being packet-multiplexed according to the MPEG encoding system.

To achieve the above objects, there is provided an MPEG picture data recording method comprising a recording step of recording a generated connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording step comprises: a detecting step of detecting the first VBV buffer occupation value relevant information corresponding to a starting position of a connection section based on the first address information, and detecting the second VBV buffer occupation value relevant information corresponding to the specified connection position in the second MPEG picture data based on the second address information, with the specified connection position specified as a boundary of the second predetermined section in at least the second MPEG picture data, wherein the connection section is a section from a boundary of the first predetermined section located a predetermined time before the specified connection position in the first MPEG picture data as the starting position to the specified connection position in the first MPEG picture data as an end position; and a re-encoding step of re-encoding the connection section decoded picture data as a picture data obtained by decoding the first MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, thereby recording the connection section re-encoded data onto a recording medium.

According to a preferred embodiment of the present invention, the recording step records a connection section MPEG multiplexed data that includes the connection section re-encoded data as an element encoded data and that has been generated by being packet-multiplexed according to the MPEG encoding system.

To achieve the above objects, there is provided an MPEG picture data recording method comprising a recording step of recording a generated connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording step comprises: a detecting step of detecting the first VBV buffer occupation value relevant information corresponding to an specified connection position in the first MPEG picture data based on the first address information, and detecting the second VBV buffer occupation value relevant information corresponding to an end position of a connection section based on the second address information, with the specified connection position specified as a boundary of the first predetermined section in at least the first MPEG picture data, wherein the connection section is a section from the specified connection position in the second MPEG picture data as a starting position to a boundary of the second predetermined section located a predetermined time after the specified connection position in the second MPEG picture data as the end position; and a re-encoding step of re-encoding the connection section decoded picture data as a picture data obtained by decoding the second MPEG picture data in the connection section, according to the MPEG encoding system, thereby to obtain the connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, thereby recording the connection section re-encoded data onto a recording medium.

According to a preferred embodiment of the present invention, the recording step records a connection section MPEG multiplexed data that includes the connection section re-encoded data as an element encoded data and that has been generated by being packet-multiplexed according to the MPEG encoding system.

To achieve the above objects, there is provided an MPEG picture data recording method comprising a recording step of recording a generated third connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein the first MPEG picture data VBV has first VBV buffer occupation value relevant information that shows an information value relating to a VBV buffer occupation value at an MPEG encoding starting point in time or an end point in time of a last picture in each first predetermined section of the first MPEG picture data, and first address information that shows a position of the first VBV buffer occupation value relevant information in the first MPEG picture data, the second MPEG picture data VBV has second VBV buffer occupation value relevant information that shows an information value relating to a VBV buffer occupation value at an MPEG encoding starting point in time or an end point in time of a last picture in each second predetermined section of the second MPEG picture data, and second address information that shows a position of the second VBV buffer occupation value relevant information in the second MPEG picture data, and the recording step comprises: a detecting step of detecting the first VBV buffer occupation value relevant information corresponding to a starting position of a first connection section based on the first address information, and detecting the second VBV buffer occupation value relevant information corresponding to an end position of a second connection section based on the second address information, wherein the first connection section is a section from a boundary of the first predetermined section located a first predetermined time before the specified connection position in the first MPEG picture data as the starting position to the specified connection position in the first MPEG picture data as an end position, and the second connection section is a section from the specified connection position in the second MPEG picture data to a boundary of the second predetermined section located a second predetermined time after the specified connection position in the second MPEG picture data as an end position; and a re-encoding step of re-encoding a third connection section decoded picture data according to the MPEG encoding system thereby to obtain a third connection section re-encoded data, by executing the re-encoding while controlling the amount of code such that a transition of the information value relating to the VBV buffer occupation value at the time of the re-encoding starts from the information value relating to the VBV buffer occupation value obtained based on the detected first VBV buffer occupation value relevant information and ends with the information value relating to the VBV buffer occupation value obtained based on the detected second VBV buffer occupation value relevant information, wherein the third connection section is a section obtained by combining the first connection section and the second connection section together, and the third connection section decoded picture data consists of a first connection section decoded picture data as a picture data obtained by decoding the first MPEG picture data in the first connection section, and a second connection section decoded picture data as a picture data obtained by decoding the second MPEG picture data in the second connection section, thereby recording the third connection section re-encoded data onto a recording medium.

According to a preferred embodiment of the present invention, the recording step records a connection section MPEG multiplexed data that includes the third connection section re-encoded data as an element encoded data and that has been generated by being packet-multiplexed according to the MPEG encoding system.

To achieve the above objects, there is provided an MPEG picture data recording method comprising a recording step of recording a generated third connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, wherein a first connection section is a section from a boundary of the first predetermined section located a first predetermined time before the specified connection position in the first MPEG picture data as the starting position to the specified connection position in the first MPEG picture data as an end position; a second connection section is a section from the specified connection position in the second MPEG picture data to a boundary of the second predetermined section located a second predetermined time after the specified connection position in the second MPEG picture data as an end position; and a third connection section is a section obtained by connecting the first connection section and the second connection section, the recording step re-encodes a third connection section decoded picture data according to the MPEG encoding system thereby to obtain a third connection section re-encoded data and record the third connection section re-encoded data onto a recording medium, wherein the third connection section decoded picture data consists of a first connection section decoded picture data as a picture data obtained by decoding the first MPEG picture data in the first connection section, and a second connection section decoded picture data as a picture data obtained by decoding the second MPEG picture data in the second connection section, and the re-encoding is executed while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position and ends with the information value relating to the VBV buffer occupation value at the time of encoding the second MPEG picture data at a position corresponding to the end position of the connection section.

To achieve the above objects, there is provided an MPEG picture data reproducing apparatus for reproducing MPEG picture data as a picture data encoded according to the MPEG encoding system, the MPEG picture data reproducing apparatus comprising: connectively reproducing means for obtaining a connection section re-encoded data that has been encoded according to an MPEG encoding system as a data for reproducing two MPEG picture data of a first MPEG picture data and a second MPEG picture data by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding the connection section decoded picture data as a picture data obtained by decoding the first MPEG picture data in the connection section, according to the MPEG encoding system, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to a starting position of the connection section and ends with the information value relating to the VBV buffer occupation value at the time of encoding the second MPEG picture data at a position corresponding to the specified connection position in the second MPEG picture data, wherein the connection section is a section from a position located a predetermined time before the specified connection position in the first MPEG picture data as the starting position to the specified connection position in the first MPEG picture data as an end position, and the connectively reproducing means reproduces the first MPEG picture data to the starting position of the connection section, and then reproduces the connection section re-encoded data from the starting position of the connection section to the end position thereof, and then reproduces the second MPEG picture data from the specified connection position in the second MPEG picture.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the connection section re-encoded data is picture data obtained from a connection section MPEG multiplexed data that includes the connection section re-encoded data as an element encoded data and that has been generated by being packet-multiplexed according to the MPEG encoding system.

To achieve the above objects, there is provided an MPEG picture data reproducing apparatus for reproducing MPEG picture data as a picture data encoded according to the MPEG encoding system, the MPEG picture data reproducing apparatus comprising: connectively reproducing means for obtaining a connection section re-encoded data that has been encoded according to an MPEG encoding system as a data for reproducing two MPEG picture data of a first MPEG picture data and a second MPEG picture data by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding the connection section decoded picture data as a picture data obtained by decoding the first MPEG picture data in the connection section, according to the MPEG encoding system, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position in the first MPEG picture data and ends with the information value relating to the VBV buffer occupation value at the time of encoding the second MPEG picture data at a position corresponding to an end position of the connection section, wherein the connection section is a section from the specified connection position in the second MPEG picture data as a starting position to a position located a predetermined time after the specified connection position in the second MPEG picture data as the end position, and the connectively reproducing means reproduces the first MPEG picture data to the specified connection position in the first MPEG picture, and then reproduces the connection section re-encoded data from the starting position of the connection section to the ending position thereof, and then reproduces the second MPEG picture data from the end position of the connection section.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the connection section re-encoded data is picture data obtained from a connection section MPEG multiplexed data that includes the connection section re-encoded data as an element encoded data and that has been generated by being packet-multiplexed according to the MPEG encoding system.

To achieve the above objects, there is provided an MPEG picture data reproducing apparatus for reproducing MPEG picture data as a picture data encoded according to the MPEG encoding system, the MPEG picture data reproducing apparatus comprising: connectively reproducing means for obtaining a third connection section re-encoded data that has been encoded according to an MPEG encoding system as a data for reproducing two MPEG picture data of a first MPEG picture data and a second MPEG picture data by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding, according to the MPEG encoding system, the third connection section decoded picture data consisting of a first connection section decoded picture data as a picture data obtained by decoding the first MPEG picture data in the first connection section, and a second connection section decoded picture data as a picture data obtained by decoding the second MPEG picture data in the second connection section, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to a starting position of the first connection section and ends with the information value relating to the VBV buffer occupation value at the time of encoding the second MPEG picture data at a position corresponding to an end position of the second connection position, wherein the first connection section is a section from a position located a first predetermined time before the specified connection position in the first MPEG picture data as the starting position to the specified connection position in the first MPEG picture data as an end position, the second connection section is a section from the specified connection position in the second MPEG picture data as a starting position to a position located a second predetermined time after the specified connection position in the second MPEG picture data as the end position, and the third connection section is a section obtained by combining the first connection section and the second connection section together, and the connectively reproducing means reproduces the first MPEG picture data to the starting position of the first connection section, and then reproduces the third connection section re-encoded data from the starting position of the third connection section to the end position thereof, and then reproduces the second MPEG picture data from the end position of the second connection section.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the third connection section re-encoded data is picture data obtained from a connection section MPEG multiplexed data that includes the third connection section re-encoded data as an element encoded data and that has been generated by being packet-multiplexed according to the MPEG encoding system.

To achieve the above objects, there is provided an MPEG picture data reproducing method comprising a connectively reproducing step of obtaining a connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding the connection section decoded picture data as a picture data obtained by decoding the first MPEG picture data in the connection section, according to the MPEG encoding system, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to a starting position of the connection section and ends with the information value relating to the VBV buffer occupation value at the time of encoding the second MPEG picture data at a position corresponding to the specified connection position in the second MPEG picture data, wherein the connection section is a section from a position located a predetermined time before the specified connection position in the first MPEG picture data as the starting position to the specified connection position in the first MPEG picture data as an end position, and the connectively reproducing step reproduces the first MPEG picture data to the starting position of the connection section, and then reproduces the connection section re-encoded data from the starting position of the connection section to the end position thereof, and then reproduces the second MPEG picture data from the specified connection position in the second MPEG picture.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the connection section re-encoded data is picture data obtained from a connection section MPEG multiplexed data that includes the connection section re-encoded data as an element encoded data and that has been generated by being packet-multiplexed according to the MPEG encoding system.

To achieve the above objects, there is provided an MPEG picture data reproducing method comprising a connectively reproducing step of obtaining a connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding the connection section decoded picture data as a picture data obtained by decoding the first MPEG picture data in the connection section, according to the MPEG encoding system, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to the specified connection position in the first MPEG picture data and ends with the information value relating to the VBV buffer occupation value at the time of encoding the second MPEG picture data at a position corresponding to an end position of the connection section, wherein the connection section is a section from the specified connection position in the second MPEG picture data as a starting position to a position located a predetermined time after the specified connection position in the second MPEG picture data as the end position, and the connectively reproducing step reproduces the first MPEG picture data to the specified connection position in the first MPEG picture, and then reproduces the connection section re-encoded data from the starting position of the connection section to the ending position thereof, and then reproduces the second MPEG picture data from the end position of the connection section.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the connection section re-encoded data is picture data obtained from a connection section MPEG multiplexed data that includes the connection section re-encoded data as an element encoded data and that has been generated by being packet-multiplexed according to the MPEG encoding system.

To achieve the above objects, there is provided an MPEG picture data reproducing method comprising a connectively reproducing step of obtaining a third connection section re-encoded data that has been encoded according to an MPEG encoding system as a data for reproducing two MPEG picture data of a first MPEG picture data and a second MPEG picture data as a picture data encoded according to the MPEG encoding system by connecting the first MPEG picture data to the second MPEG picture data at specified connection positions specified in the respective MPEG picture data, and then connectively reproducing the first MPEG picture data and the second MPEG picture data, wherein the connection section re-encoded data is re-encoded data generated by re-encoding, according to the MPEG encoding system, the third connection section decoded picture data consisting of a first connection section decoded picture data as a picture data obtained by decoding the first MPEG picture data in the first connection section, and a second connection section decoded picture data as a picture data obtained by decoding the second MPEG picture data in the second connection section, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to a starting position of the first connection section and ends with the information value relating to the VBV buffer occupation value at the time of encoding the second MPEG picture data at a position corresponding to an end position of the second connection position, wherein the first connection section is a section from a position located a first predetermined time before the specified connection position in the first MPEG picture data as the starting position to the specified connection position in the first MPEG picture data as an end position, the second connection section is a section from the specified connection position in the second MPEG picture data as a starting position to a position located a second predetermined time after the specified connection position in the second MPEG picture data as the end position, and the third connection section is a section obtained by combining the first connection section and the second connection section together, and the connectively reproducing step reproduces the first MPEG picture data to the starting position of the first connection section, and then reproduces the third connection section re-encoded data from the starting position of the third connection section to the end position thereof, and then reproduces the second MPEG picture data from the end position of the second connection section.

According to a preferred embodiment of the present invention, the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the third connection section re-encoded data is picture data obtained from a connection section MPEG multiplexed data that includes the third connection section re-encoded data as an element encoded data and that has been generated by being packet-multiplexed according to the MPEG encoding system.

The nature, principle and utility of the invention will become more apparent from the following detailed description when read in conjunction with the accompanying drawings.

DESCRIPTION OF THE PREFERRED EMBODIMENTS

According to the present invention, there are provided an MPEG picture data recording apparatus, an MPEG picture data recording method, an MPEG picture data generating apparatus, an MPEG picture data reproducing apparatus, an MPEG picture data reproducing method, and a recording medium capable of reproducing seamless MPEG picture data when a new MPEG picture data is additionally recorded in the middle or at the end of an MPEG picture data that has already been recorded, without generating a contradiction of an overflow or an underflow in the connection of VBV buffers during a reproduction time. Further, according to the present invention, it is also possible to identify a starting value of VBV at a starting point of an MPEG picture data that is to be additionally recorded, without a need for decoding an MPEG picture data that has already been recorded, and it is possible to reduce a size of a circuit scale and reduce a calculation time.

The concept of the present invention will be explained with reference to FIG. 7. A recording medium is recorded with an MPEG picture data that is a picture data compressed according to an MPEG encoding system. This MPEG picture data is recorded as a bit stream of a plurality of continuous data that have been generated by encoding in a one-time recording unit and that can be reproduced continuously.

In addition to the bit stream of the encoded MPEG picture data, the recording medium is recorded with a VBV buffer value (an occupation value) at an end point in time of encoding for a picture one frame before an I picture, a VBV buffer value (an occupation value) at an end point in time of encoding for a picture one frame before a P picture, and a VBV buffer value (an occupation value) at an end point in time of recording, in the bit stream of the MPEG picture data respectively, and address information that shows an address of the position of each VBV buffer value in the MPEG picture data (in this case, a relative address from the start of the file of the MPEG picture data). FIG. 7 shows a data structure of the VBV buffer information including these data.

The VBV buffer information has a hierarchical structure. First, there is an entry point information structure unit, and thereafter, there is a VBV information structure unit. The entry point information structure unit first describes a number of addresses of entry points (EP) in 32 bits, and then sequentially describes EPn addresses (where n is a natural number of 1 or above) in 32 bits. The EPn addresses show positions where the EPn information (where n is a natural number of 1 or above) of the VBV information structure unit is described. The EPn addresses are relative addresses from the header of the VBV buffer information. On the other hand, the VBV information structure unit describes the EP information starting from the EP1 information. The EP1 information includes a relative address, a PTM value, and a VBV value in this order.

Figure 8:
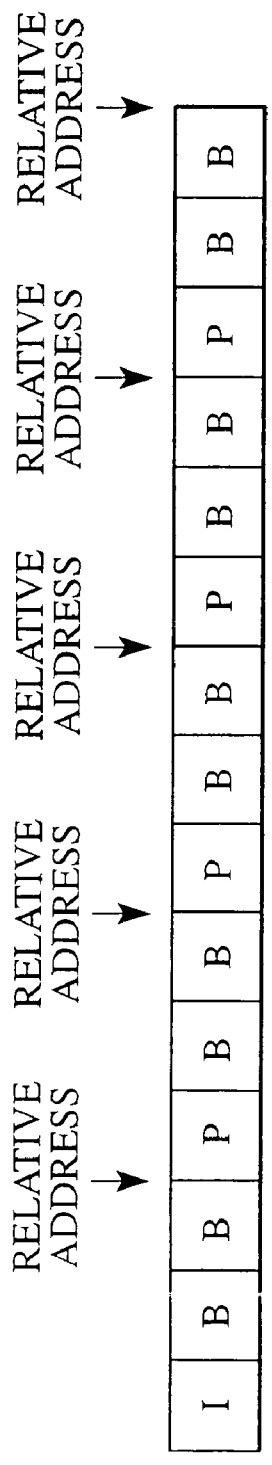
FIG. 8 is a diagram showing a relationship between MPEG picture data and a relative address according to one embodiment of the present invention.

The relative addresses in the EPn information of the VBV information structure unit are the relative addresses of an end point in time of encoding of a picture one frame before an I picture, an end point in time of encoding of a picture one frame before a P picture, and an end point in time of recording, from the header of the MPEG picture data in the bit stream of the MPEG picture data respectively, as shown in FIG. 8. The relative addresses use a byte as a unit, for example. When the data are recorded on a disk medium, sectors are used as the relative addresses.

The PTM value in the EPn information of the VBV information structure unit is a time stamp recorded in a clock of 90 KHz or 27 MHz in the MPEG system standard (multiplexing standard). In the MPEG standard, this time stamp is called a PTS (Presentation Time Stamp) or a DTS (Decoding Time Stamp). In the present example, the DTS is recorded as the time information of an end point in time of encoding of a picture one frame before an I picture, an end point in time of encoding of a picture one frame before a P picture, and an end point in time of recording, in the bit stream of the MPEG picture data respectively. The DTS is recorded by one for one picture. In the case of a video signal of the NTSC, the DTS is recorded at intervals of 3,003 clocks for one picture in 90 KHz. Therefore, when either an I picture or a P picture exists for each three pictures like in the case of the present invention, and also when the clock starts with zero at the beginning, the PTM information is described in the EPn information at intervals of 9,009, 18,018, and so on.

Figure 9:
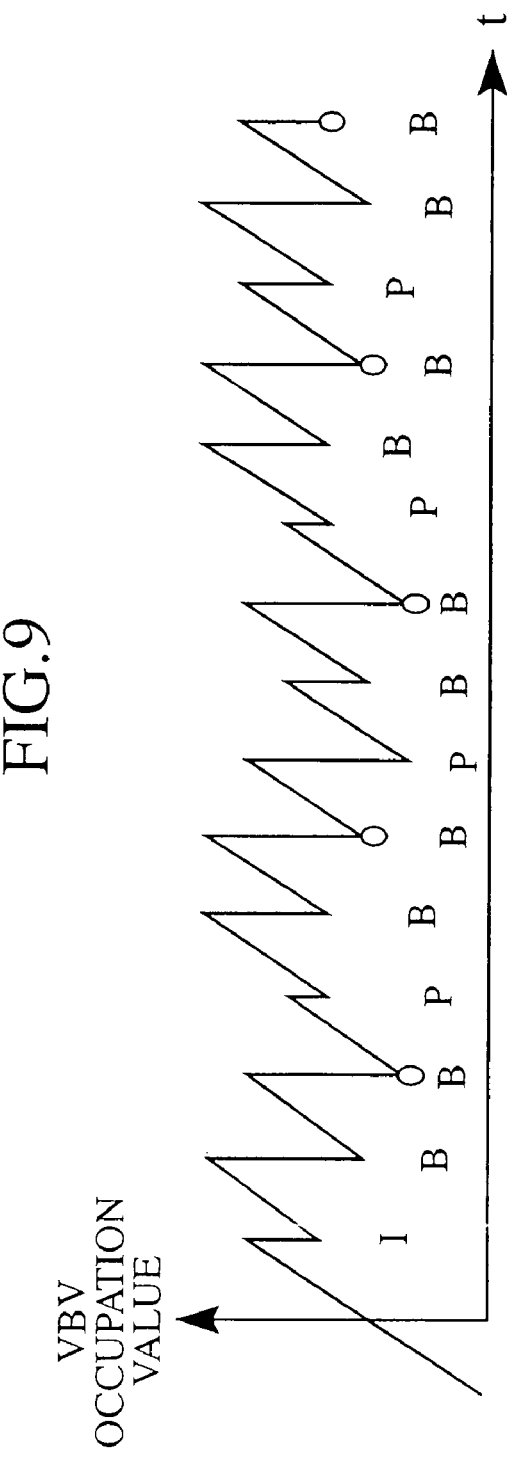
FIG. 9 is a diagram for explaining a VBV value according to one embodiment of the present invention.

The VBV value in the EPn information of the VBV information structure unit is a value of occupation of a virtual buffer in a decoder prescribed in the MPEG. The VBV value can be obtained by calculation from a generated amount of code for each one picture in the MPEG picture data and a value of a transfer rate. As shown in FIG. 9, there are described VBV occupation values at an end point in time of encoding of a picture one frame before an I picture, and an end point in time of encoding of a picture one frame before a P picture, and an end point in time of recording, (at each position of a ○ mark shown in FIG. 9) respectively in the compressed bit stream information. Alternatively, there are described $VBV_{delay}$ values prescribed in the MPEG at the each point. These $VBV_{delay}$ values are the values that show how much time is required to reach the respective VBV occupation values at the then transfer rate. In the present invention, the VBV values may be any values so long as the values are the information relating to values of occupation of a VBV buffer.

In the MPEG compression, basically, the encoding is executed using a picture type of I or P in the unit of three frames like IBB and PBB. In the MPEG compression, there is a possibility that a B picture is predicted from both directions. Therefore, in the sequence of an encoded bit stream, it is not possible to additionally connect data except at only an end point in time of encoding of a picture one frame before an I picture, and at an end point in time of encoding of a picture one frame before a P picture of the bit stream. Consequently, the present invention is characterized in that the VBV information is described at an end point in time of encoding of a picture one frame before an I picture, and at an end point in time of encoding of a picture one frame before a P picture in the bit stream.

Figure 10:
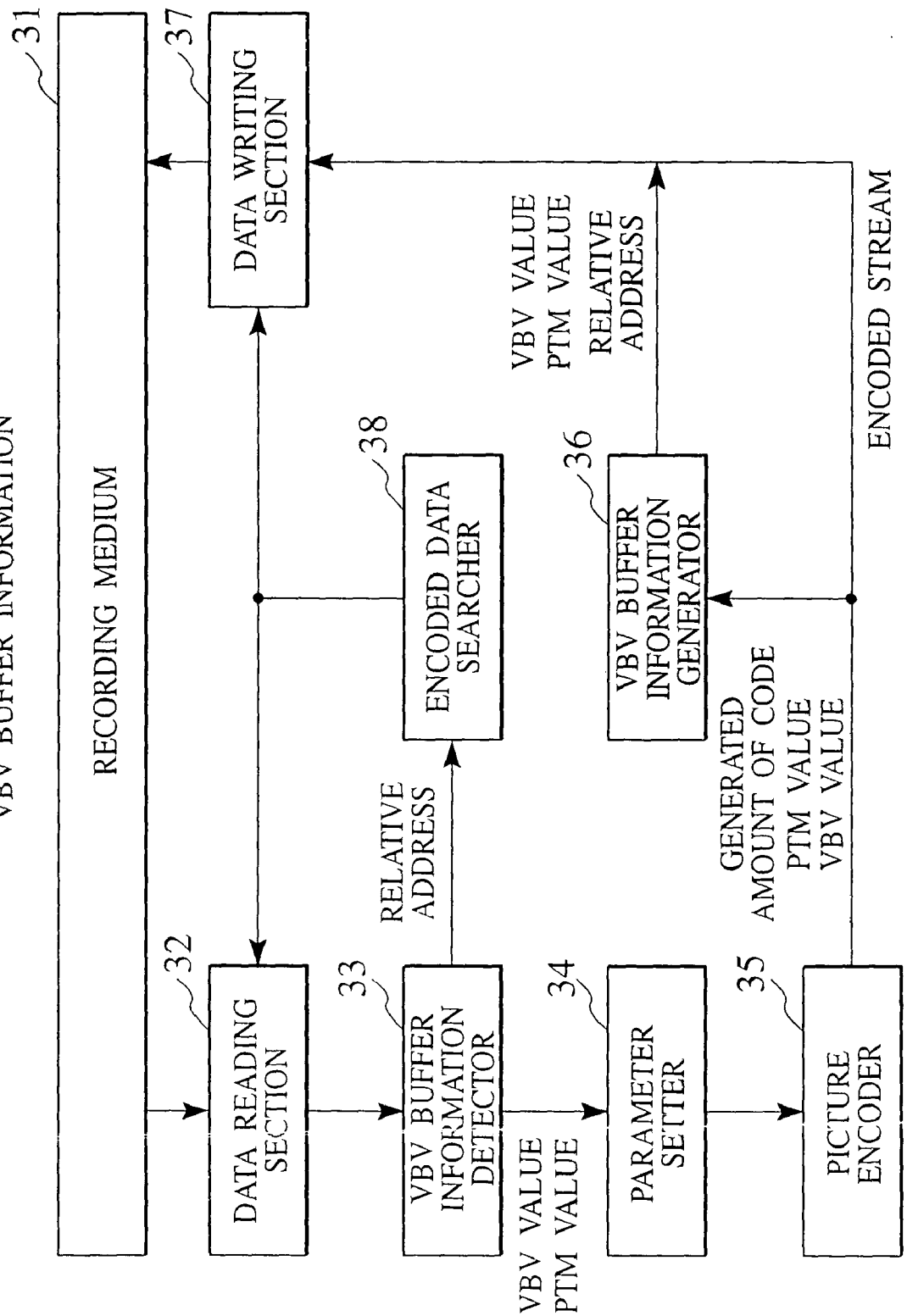
FIG. 10 is a block diagram showing one embodiment of a recording and reproducing apparatus to which the present invention is applied.

FIG. 10 shows a structure of a recording apparatus according to one embodiment of the present invention. The operation of preparing the VBV buffer information while encoding a picture data according to the MPEG encoding system will be explained below with reference to FIG. 10.

In a status that there is no encoded data in a recording medium 31 at all, that is, when data is to be encoded for the first time, a data reading section 32 for reading data from the recording medium 31 has no data. Therefore, the data reading section 32 transmits information to show that there is no data, to a VBV buffer information detector 33. As the VBV buffer information detector 33 does not have data either, a preset initial value has been set in advance to a parameter setter 34. For example, the VBV value is set as a value of 80% of a maximum value of the VBV prescribed in the MPEG, and the PTM time stamp information is set as zero. The parameter setter 34 transmits these initial set values to a picture encoder 35.

The picture encoder 35 starts the encoding starting from the initial set values. While executing the encoding, the picture encoder 35 transmits a generated amount of code, a PTM value, and a VBV value at an end point in time of encoding of a picture one frame before an I picture, and at an end point in time of encoding of a picture one frame before a P picture in the bit stream, to a VBV buffer information generator 36 each time. At the same time, the picture encoder 35 transmits an encoded data to a data writing section 37. Further, the picture encoder 35 transmits to the VBV buffer information generator 36, a generated amount of code, a PTM value, and a VBV value at a point of time when a user has temporarily stopped or ended a compressed recording of a picture.

Figure 7:
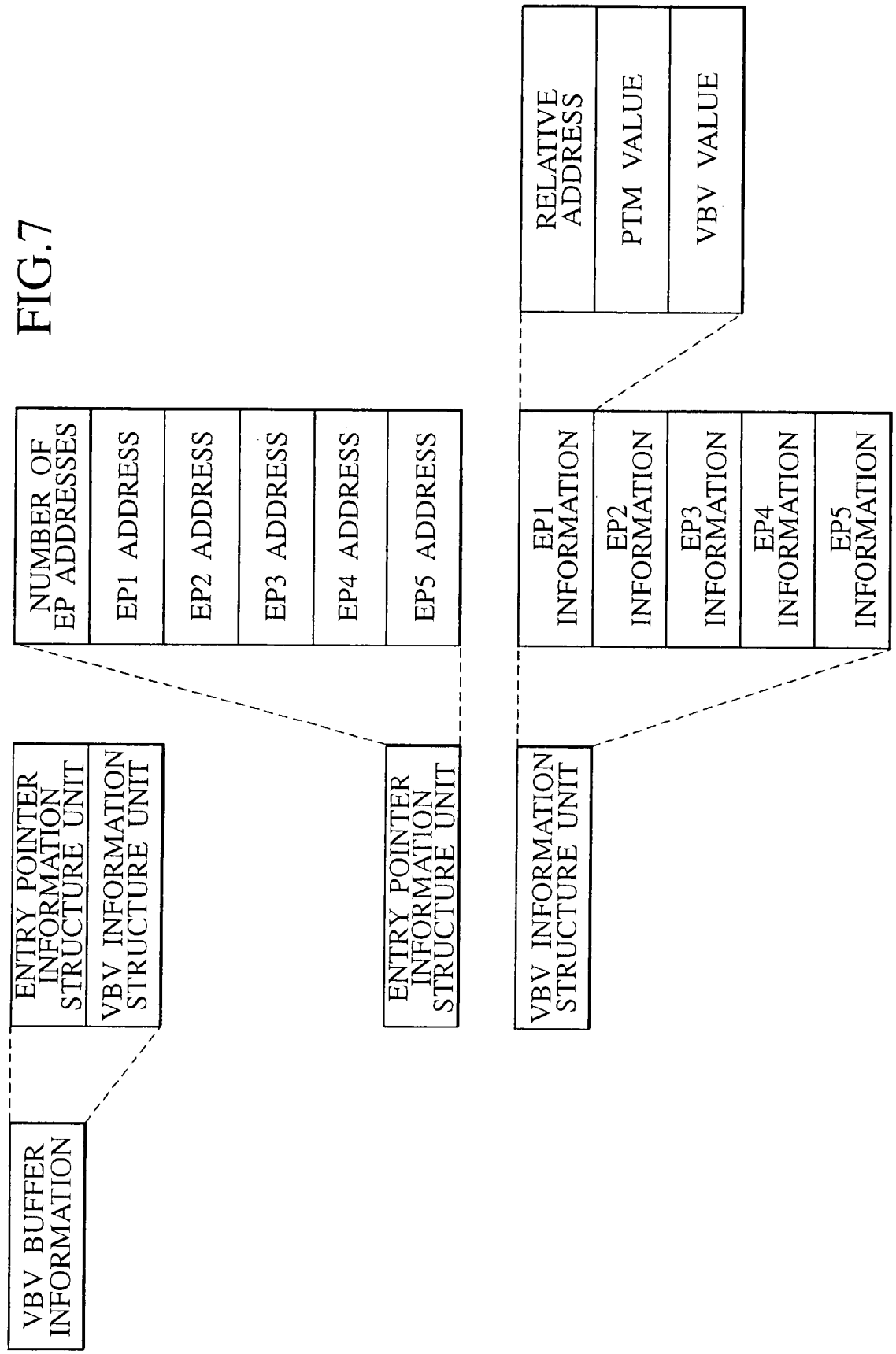
FIG. 7 is a diagram showing a structure of VBV buffer information based on one embodiment of a recording and reproducing apparatus to which the present invention is applied.

The VBV buffer information generator 36 generates a data of VBV buffer information of a structure shown in FIG. 7 based on a generated amount of code, a PTM value, and a VBV value that have been input. Alternatively, the VBV buffer information generator 36 memories a data necessary for generating this data structure, and records and stores this data in a predetermined format. The information generated by the VBV buffer information generator 36 may be written in burst at the same time when the encoded data (the MPEG picture data) is being written onto the recording medium 31 by the data writing section 37. Further, the information generated by the VBV buffer information generator 36 may be transformed from the data recorded and held in the predetermined format into the structure shown in FIG. 7, and written onto the recording medium 31 by the data writing section 37, after the writing of the encoded data (the MPEG picture data) has been finished, or after the user has temporarily stopped or ended a compressed recording of a picture.

Next, the operation of adding a new picture data to a predetermined position of the encoded data (the MPEG picture data) that has already been recorded together with the VBV buffer information on the recording medium 31, and recording this new picture data onto the recording medium 31 will be explained.

The recording medium 31 has already been recorded with an encoded stream (a bit stream of the MPEG picture data). Therefore, the data reading section 32 reads the VBV buffer information from the recording medium 31, and obtains a VBV value, a PTM value, and relative addresses. When the recording of a new data is to be executed by adding this data to the last end of the encoded stream already recorded, the end value of the existing VBV buffer information (the VBV buffer information of which relative address is the furthest from the header of the encoded stream) is referred to. On the recording medium 31, the new MPEG picture data to be recorded may be added to a position that follows the recorded position of the MPEG picture data already recorded or to a quite separate position.

In the case of additionally writing the MPEG picture data to an intermediate position of an encoded stream already recorded, the user specifies from a user interface not shown a point of the picture data already recorded to which the MPEG picture data is to be added. For example, when position information of a relative address of the data is specified, the VBV value and the PTM value linked to the data of a value nearest the relative address information within the EPn information of the VBV buffer information structure are used. When a time from the starting time of the data or time stamp information of a point from which the additional recording of the MPEG picture data is to be started is specified, the PTM value within the EPn information of the VBV buffer information structure is used in a similar manner. When this value has been recorded in the clock of 90 KHz, this value is multiplied by a value of a 1/90,000 second, thereby to be able to obtain a time in the order of a second. It is also possible to obtain a position (a relative address) for the additional recording to be executed at the intermediate point of the coded stream, the VBV value, and the PTM value.

These values are input to the parameter setter 34. Then, the picture encoder 35 starts the encoding from the set value. (The encoding is executed by starting the VBV buffer control based on the detected VBV value.)

In the mean time, an encoded data searcher 38 searches the bit stream already recorded for a header position of a section A to be re-encoded. In this searching, a relative address of the data is used, and a pointer is set to a position from the header of the bit stream file.

While executing the encoding, the picture encoder 35 transmits a generated amount of code, a PTM value, and a VBV value at an end point in time of encoding of a picture one frame before an I picture, and at an endpoint in time of encoding of a picture one frame before a P picture in the bit stream, to a VBV buffer information generator 36 each time. At the same time, the picture encoder 35 transmits an encoded data to a data writing section 37. Further, the picture encoder 35 transmits to the VBV buffer information generator 36, a generated amount of code, a PTM value, and a VBV value at a point of time when a user has temporarily stopped or ended a compressed recording of a picture.

The VBV buffer information generator 36 generates a data of VBV buffer information of a structure shown in FIG. 7 based on a generated amount of code, a PTM value, and a VBV value that have been input. Alternatively, the VBV buffer information generator 36 memories a data necessary for generating this data structure, and records and stores this data in a predetermined format. The information generated by the VBV buffer information generator 36 may be written in burst at the same time when the encoded data (the MPEG picture data) is being written onto the recording medium 31 by the data writing section 37. Further, the information generated by the VBV buffer information generator 36 may be transformed from the data recorded and held in the predetermined format into the structure shown in FIG. 7, and written onto the recording medium 31 by the data writing section 37, after the writing of the encoded data (the MPEG picture data) has been finished, or after the user has temporarily stopped or ended a compressed recording of a picture.

The new MPEG picture data is additionally recorded at a point of the additional recording in the intermediate of the MPEG picture data already recorded.

The new MPEG picture data to be additionally recorded at an intermediate point of the MPEG picture data already recorded may be overwritten on the MPEG picture data at a portion where the MPEG picture data has already been recorded on the recording medium 31. Alternatively, the new MPEG picture data to be additionally recorded may be recorded at a position on the recording medium 31 quite separate from the position of the MPEG picture data already recorded on the recording medium 31. (In this case, it is necessary to link the new MPEG picture data to the additional recording point on the MPEG picture data already recorded.)

In the above example, it has been explained that the new MPEG picture data to be additionally recorded is recorded onto a recording medium on which an MPEG picture data has already been recorded. However, it is also possible to record the new MPEG picture data onto a separate recording medium together with an MPEG picture data read from the recording medium 31, according to the above method.

Next, the concept of a connection reproduction that can be realized by the present invention will be explained in detail.

Figure 11:
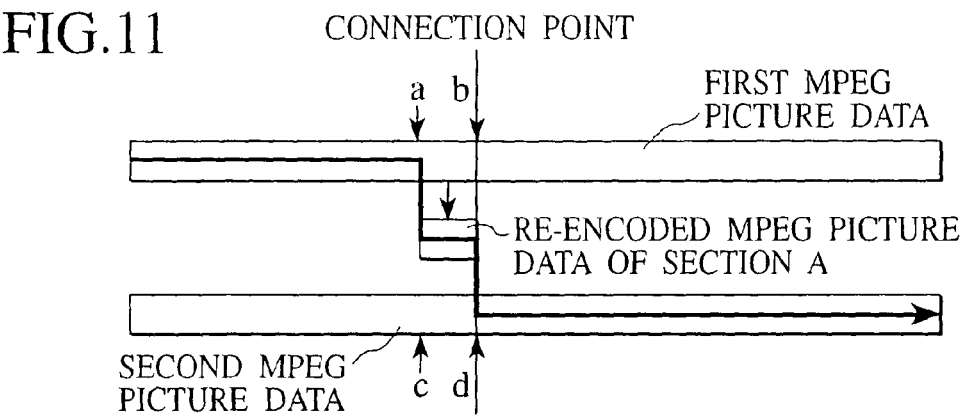
FIG. 11 is a diagram for explaining the concept of a connection reproduction that can be realized in the present invention.

Consider a case where a first MPEG picture data as a picture data encoded by the MPEG encoding system and a second MPEG picture data as a picture data encoded by the MPEG encoding system exist, and the second MPEG picture data is reproduced by connecting this data to an intermediate point (a specified connection point) of the first MPEG picture data, as shown in FIG. 11. Assume that a connection point (the specified connection position in the first MPEG picture data) is a point b. In this case, the first, MPEG picture data is reproduced up to the point b, and thereafter, the first MPEG picture data is connected to the second MPEG picture data and the data is reproduced. When the MPEG picture data are simply connected, there arises a contradiction in the connection of VBV buffers, and an overflow or an underflow occurs.

Therefore, first, VBV buffer information at the time of encoding the first MPEG picture data and the second MPEG picture data according to the MPEG encoding system is generated as side information in a predetermined section unit (a first predetermined section unit for the first MPEG picture data, and a second predetermined section unit for the second MPEG picture data), and this side information is described in the recording medium in advance.

The VBV buffer information relating to the first MPEG picture data includes first VBV buffer occupation value relevant information that shows an information value relating to a VBV buffer occupation value at an MPEG encoding starting point or an end point of a last picture in each of first predetermined sections of the first MPEG picture data, and first address information that shows a position from which the VBV buffer occupation value relevant information is obtained in the first MPEG picture data.

The VBV buffer information relating to the second MPEG picture data includes second VBV buffer occupation value relevant information that shows an information value relating to a VBV buffer occupation value at an MPEG encoding starting point in time or an end point in time of a last picture in each of second predetermined sections of the second MPEG picture data, and second address information that shows a position from which the VBV buffer occupation value relevant information is obtained in the second MPEG picture data.

The information value relating to the VBV buffer occupation value is, for example, a VBV buffer occupation value or a $VBV_{delay}$ value prescribed in the MPEG.

One unit of the first and second predetermined sections respectively may be about three frames or about one GOP as described later, for example. Assume that the predetermined section of the first MPEG picture data is a section from a to b in FIG. 11, and the predetermined section of the second MPEG picture data is a section from c to d in FIG. 11.

In an information list of the VBV buffers, there are described the information of the VBV buffer at the position a (a boundary of the first predetermined section that is a first predetermined time before the specified connection position in the first MPEG picture data: that is, a starting position of the section A to be described later), and the information of the VBV buffer at the position b (the specified connection position in the first MPEG picture data: that is, the end position of the section A to be described later). In the VBV buffer information list, there are also described the information of the VBV buffer at the position c of the second MPEG picture data (a boundary of the second predetermined section that is a second predetermined time before the specified connection position in the second MPEG picture data), and the information of the VBV buffer at the connection point d (the specified connection position in the second MPEG picture data: a boundary position of the second predetermined section in the case of this example).

The data of the section a-b (a first connection section: the section A) of the first MPEG picture data is once decoded to obtain a decoded picture data. Then, this decoded picture data (the decoded picture data of the first connection section) is encoded again according to the MPEG encoding system. The re-encoded data generated in this way will be called a re-encoded MPEG picture data of the section A (a re-encoded data of the first connection section). This re-encoding is executed according to the MPEG encoding system by controlling a rate of a transition of the information value relating to the VBV buffer occupation value such that the transition of the information value starts from the information value relating to the VBV buffer occupation value obtained based on the detected first VBV buffer occupation value relevant information at the point a and ends with the information value relating to the VBV buffer occupation value obtained based on the detected second VBV buffer occupation value relevant information at the point d.

A reproduction up to the position b of the first MPEG picture data is executed as the conventional connection reproduction operation, and thereafter, the data is connected to the position d of the second MPEG picture data, and the data is reproduced, by using the re-encoded MPEG picture data of the section A, as follows. Namely, the first MPEG picture data is reproduced up to the position a (the starting position of the section A) of the first MPEG picture data. Then, the re-encoded MPEG picture data of the section A is reproduced from the starting position to the end position of this section. Thereafter, the data is connected to the position d (the specified connection position) of the second MPEG picture data, and the second MPEG picture data at the point d and after is reproduced. A reproduction apparatus is provided with a connection reproducing unit for executing this operation to realize this operation.

Based on this connection reproduction operation, it becomes possible to realize a seamless connection reproduction having the same contents as the original first and second MPEG picture data, without generating a contradiction at the VBV buffers.

In order to obtain the re-encoded MPEG picture data of the connection section based on only the first MPEG picture data as shown in FIG. 11, the information of the VBV buffer at the connection point d (the specified connection position in the second MPEG picture data) becomes necessary. As the VBV buffer information is the information of the MPEG encoding starting point in time or end point in time of the last picture of each predetermined section of the MPEG picture data as described above, this VBV buffer information becomes the information at the boundary position of the predetermined section. Therefore, it is necessary to specify the position of the connection point (the specified connection position) as the boundary of the second predetermined section in at least the second MPEG picture data. (In other words, it is necessary to specify the position of the connection point d in the second MPEG picture data as the boundary of the second predetermined section.)

Further, in order to obtain the re-encoded MPEG picture data of the connection section based on only the first MPEG picture data, the information of the VBV buffer at the point a (the starting position of the connection section A) shown in FIG. 11 becomes necessary as described above. However, as the position a is specified as the boundary of the first predetermined section that is the first predetermined time before the connection point (the specified connection position) b in the first MPEG picture data, it is possible to obtain the VBV buffer information at the position a regardless of the position of the connection point b. Consequently, it is not always necessary that the position of the connection point b in the first MPEG picture data is specified as the boundary of the first predetermined section.

Figure 12A:
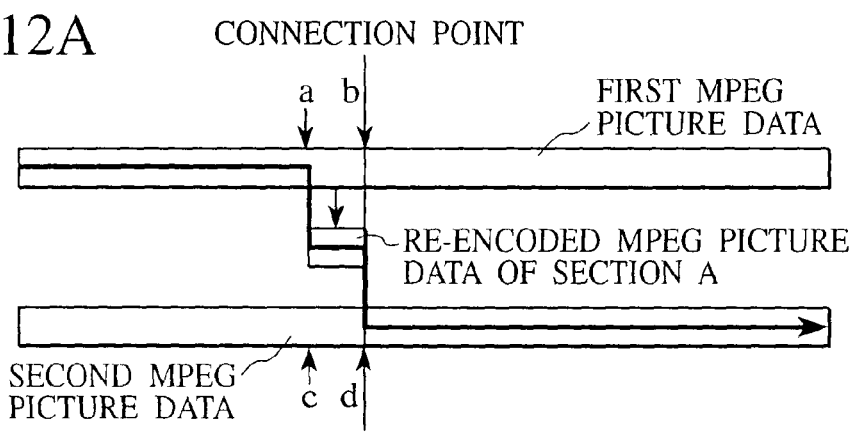
FIGS. 12A to 12C are diagrams for explaining the concept of a connection reproduction that can be realized in the present invention.
Figure 12B:
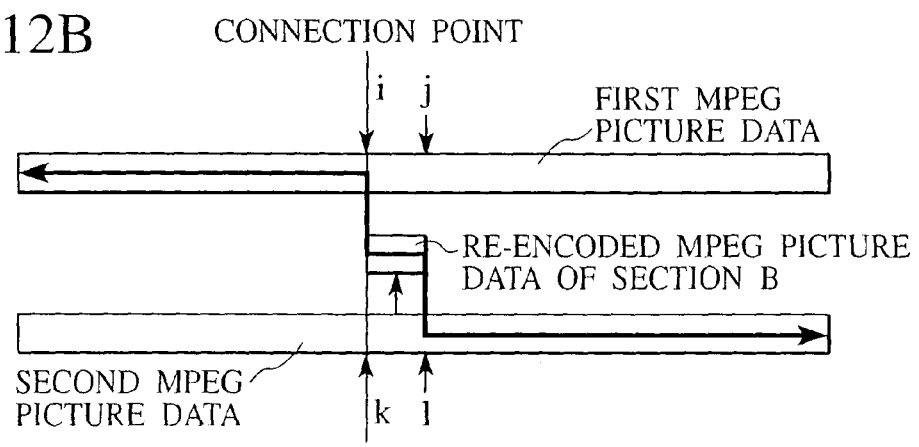
Figure 12C:
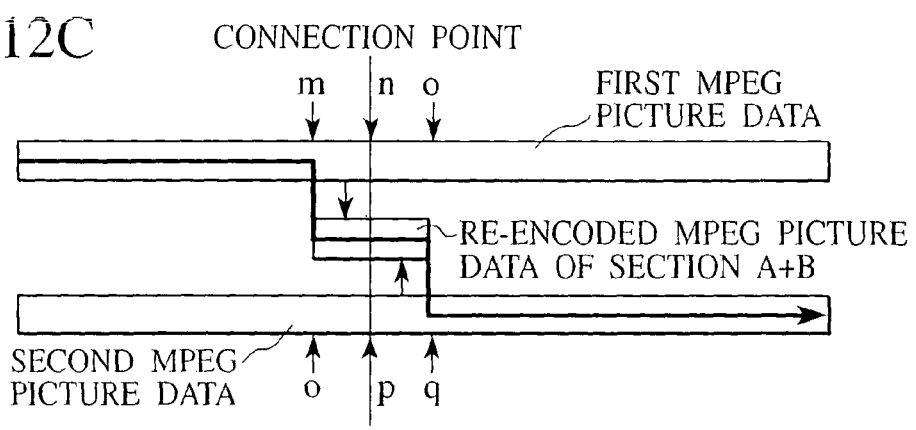

FIGS. 12B and 12C show application examples of this operation. FIG. 12A shows an operation similar to that shown in FIG. 11. In the example shown in FIG. 11, the encoded MPEG picture data of the connection section is obtained based on only the first MPEG picture data, and the data connection reproduction is realized. It is also possible to realize a connection reproduction of the data by obtaining the encoded MPEG picture data of the connection section based on only the second MPEG picture data. FIG. 12B shows this example that uses an encoded MPEG picture data of the connection section B in the second MPEG picture data.

In FIG. 12B, the connection point (the specified connection position) in the first MPEG picture data is a point i, and the connection point (the specified connection position) in the second MPEG picture data is a point k. Assume that one unit of the first predetermined section as a unit that has the VBV buffer information in the first MPEG picture data is a section i-j, and one unit of the second predetermined section as a unit that has the VBV buffer information in the second MPEG picture data is a section k-l. The position of l becomes a boundary position of a second predetermined section that is a second predetermined time after the connection point (the specified connection position) k in the second MPEG picture data. A section from the connection point k as a starting position to the position of l as an end position is set as a connection section B (a second connection section).

The data of the connection section B (the section k-l) of the second MPEG picture data is once decoded to obtain a decoded picture data. Then, this decoded picture data (the decoded picture data of the second connection section) is encoded again according to the MPEG encoding system. The re-encoded data generated in this way will be called a re-encoded MPEG picture data of the section B (a re-encoded data of the second connection section). This re-encoding is executed according to the MPEG encoding system by controlling a rate of a transition of the information value relating to the VBV buffer occupation value such that the transition of the information value starts from the information value relating to the VBV buffer occupation value obtained based on the first VBV buffer occupation value relevant information at the point i and ends with the information value relating to the VBV buffer occupation value obtained based on the second VBV buffer occupation value relevant information at the point l.

Then, the connection reproduction from the first MPEG picture data to the second MPEG picture data is executed using the re-encoded MPEG picture data of the connection section B. In other words, the first MPEG picture data is reproduced up to the connection point i (the specified connection position) of the first MPEG picture data. Then, the re-encoded MPEG picture data of the section B is reproduced from the starting position to the end position of this section. Thereafter, the data is connected to the position l (the end position of the connection section B) of the second MPEG picture data, and the second MPEG picture data at the point l and after is reproduced. A reproduction apparatus is provided with a connection reproducing unit for executing this operation to realize this operation.

Based on this connection reproduction operation, it becomes possible to realize a seamless connection reproduction having the same contents as the original first and second MPEG picture data, without generating a contradiction at the VBV buffers.

In order to obtain the re-encoded MPEG picture data of the connection section based on only the second MPEG picture data as shown in FIG. 12B, the information of the VBV buffer at the connection point i (the specified connection position in the first MPEG picture data) becomes necessary. As the VBV buffer information is the information of the MPEG encoding starting point in time or end point in time of the last picture of each predetermined section of the MPEG picture data as described above, this VBV buffer information becomes the information at the boundary position of the predetermined section. Therefore, it is necessary to specify the position of the connection point (the specified connection position) as the boundary of the first predetermined section in at least the first MPEG picture data. (In other words, it is necessary to specify the position of the connection point i in the first MPEG picture data as the boundary of the first predetermined section.)

Further, in order to obtain the re-encoded MPEG picture data of the connection section based on only the second MPEG picture data, the information of the VBV buffer at the point l (the end position of the connection section B) shown in FIG. 12B becomes necessary as described above. However, as the position l is specified as the boundary of the second predetermined section that is the second predetermined time after the connection point (the specified connection position) k in the second MPEG picture data, it is possible to obtain the VBV buffer information at the position l regardless of the position of the connection point k. Consequently, it is not always necessary that the position of the connection point k in the second MPEG picture data is specified as the boundary of the second predetermined section.

Next, an application example shown in FIG. 12C will be explained. In this example, a re-encoded MPEG picture data of a connection section is obtained based on first and second MPEG picture data before and after a connection point, and the data is reproduced.

In FIG. 12C, the connection point (the specified connection position) in the first MPEG picture data is a point n, and the connection point (the specified connection position) in the second MPEG picture data is a point p. Assume that one unit of the first predetermined section as a unit that has the VBV buffer information in the first MPEG picture data is a section m-n, and one unit of the second predetermined section as a unit that has the VBV buffer information in the second MPEG picture data is a section p-q.

The position of m becomes a boundary position of a first predetermined section that is a first predetermined time before the connection point (the specified connection position) n in the first MPEG picture data. A section from the position of m as a starting position to the position of the connection point n as an end position is set as a connection section A (a first connection section). The position of q becomes a boundary position of a second predetermined section that is a second predetermined time after the connection point (the specified connection position) p in the second MPEG picture data. A section from the connection point p as a starting position to the position of q as an end position is set as a connection section B (a second connection section).

The data of the connection section A (the section m-n) of the first MPEG picture data is once decoded to obtain a decoded picture data (the decoded picture data of the connection section A: the decoded picture data of the first connection section). Further, the data of the connection section B (the section p-q) of the second MPEG picture data is once decoded to obtain a decoded picture data (the decoded picture data of the connection section B: the decoded picture data of the second connection section).

Then, the decoded picture data of the connection sections A+B (a decoded picture data of a third connection section), that is a section obtained by combining the decoded picture data of the connection section A and the decoded picture data of the connection section B, is encoded again according to the MPEG encoding system. The re-encoded data generated in this way will be called a re-encoded MPEG picture data of the connection section A+B (a re-encoded data of the third connection section). This re-encoding is executed according to the MPEG encoding system by controlling a rate of a transition of the information value relating to the VBV buffer occupation value such that the transition of the information value starts from the information value relating to the VBV buffer occupation value obtained based on the first VBV buffer occupation value relevant information at the point m and ends with the information value relating to the VBV buffer occupation value obtained based on the second VBV buffer occupation value relevant information at the point q.

Then, the connection reproduction from the first MPEG picture data to the second MPEG picture data is executed using the re-encoded MPEG picture data of the connection section A+B. In other words, the first MPEG picture data is reproduced up to the starting position m of the connection section A of the first MPEG picture data. Then, the re-encoded MPEG picture data of the connection section A+B is reproduced from the starting position to the end position of this section. Thereafter, the data is connected to the end position q of the second MPEG picture data, and the second MPEG picture data at the point q and after is reproduced. A reproduction apparatus is provided with a connection reproducing unit for executing this operation to realize this operation.

Based on this connection reproduction operation, it becomes possible to realize a seamless connection reproduction having the same contents as the original first and second MPEG picture data, without generating a contradiction at the VBV buffers.

In the example shown in FIG. 12C, the information of the VBV buffer at the position m (the starting position of the connection section A) becomes necessary as described before. As the position m is specified as the boundary of the first predetermined section that is the first predetermined time before the connection point (the specified connection position) n in the first MPEG picture data, it is possible to obtain the VBV buffer information at the position m regardless of the position of the connection point n. Consequently, it is not always necessary that the position of the connection point n in the first MPEG picture data is specified as the boundary of the first predetermined section.

Further, the information of the VBV buffer at the position q (the end position of the connection section B) shown in FIG. 12C also becomes necessary as described before. As the position q is specified as the boundary of the second predetermined section that is the second predetermined time after the connection point (the specified connection position) p in the second MPEG picture data, it is possible to obtain the VBV buffer information at the position q regardless of the position of the connection point p. Consequently, it is not always necessary that the position of the connection point p in the second MPEG picture data is specified as the boundary of the second predetermined section.

As explained above, according to the methods shown in FIGS. 12A to 12C, it is possible to realize a seamless connection reproduction of MPEG picture data in high definition.

Figure 13:
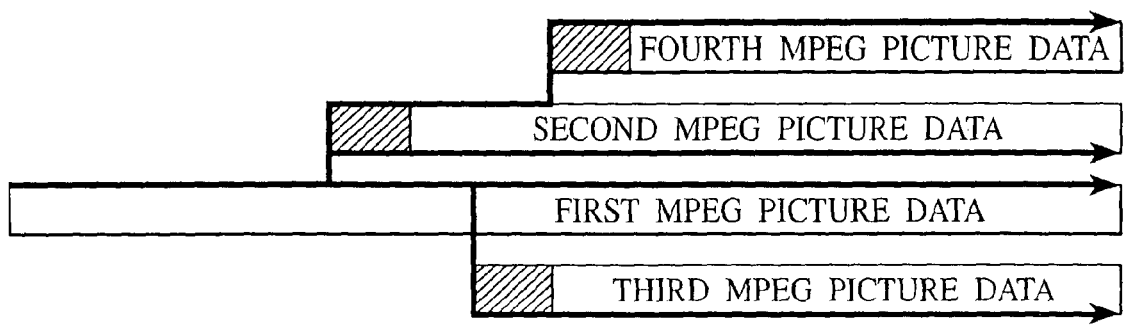
FIG. 13 is a diagram for explaining the concept of a connection reproduction that can be realized in the present invention.

As an expanded system of the above, it becomes possible to realize a connection reproduction of a first MPEG picture data, a second MPEG picture data, third MPEG picture data, and a fourth MPEG picture data, based on an intermediate branching, as shown in FIG. 13. According to the present invention, it is possible to freely connect a MPEG picture data to other MPEG picture data, by simply generating and utilizing a re-encoded MPEG picture data in a connection section, without the need for utilizing the original MPEG picture data. Therefore, in the case of encoding a program that constitutes various branched stories, it becomes possible to efficiently use a medium without recording a redundant MPEG picture data that extends over the whole story for each branch story. (According to the present invention, it is sufficient to prepare each one set of data from the first to fourth MPEG picture data respectively, and the re-encoded MPEG picture data in the connection section for each branch story.)

When the method shown in FIG. 12C is used, it is not always necessary that the position of the connection point in the first MPEG picture data is specified as the boundary of the first predetermined section. Further, it is not always necessary that the position of the connection point in the second MPEG picture data is specified as the boundary of the second predetermined section. Therefore, it is possible to apply the method to a case where the VBV buffer information in each section is described as side information that is edited in a finer precision than the unit of the predetermined section, like, for example, one frame unit. An example of this case will be explained with reference to FIG. 14. A predetermined unit may be about three frames or about one GOP. In this example, one GOP is assumed as the predetermined unit.

Figure 14:
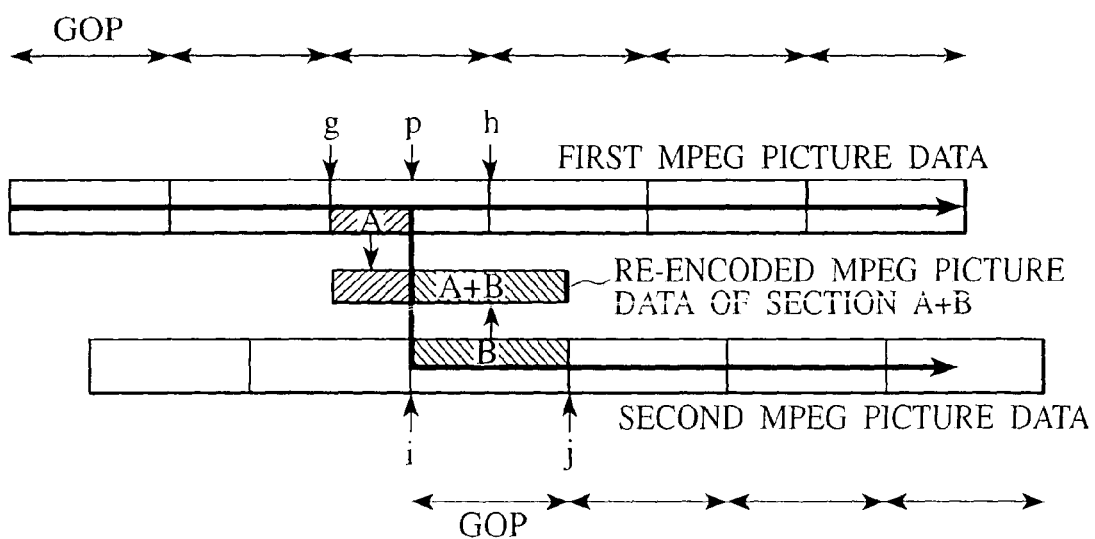
FIG. 14 is a diagram for explaining the concept of a connection reproduction that can be realized in the present invention.

Assume that there exist two streams of MPEG picture data to be connected as shown in FIG. 14. At points g and h indicated by arrow marks in the first MPEG stream, there are described in the VBV buffer information list the VBV buffer information at the point g and the VBV buffer information at the point h. In the second MPEG picture data, there also exist the VBV buffer information at the position i and the VBV buffer information at the position j.

In the case of connecting the first MPEG stream 1 at the point p of this data to the header of the second MEPEG stream, the data of a section A from the point g to the point p of the first MPEG stream is decoded first. Then, the data of a section B from the point i to the point j of the second MPEG stream is decoded. Both pictures are re-encoded such that the transition of the buffers starts from a buffer occupation value at the position g and ends with a buffer occupation value at the position of j.

The data generated in this way will be called the re-encoded MPEG picture data of the section A+B. The data up to the position p of the first MPEG picture data is reproduced first, and then the data is connected to the second MPEG picture data, and the data is reproduced, according to the conventional manner of reproduction. This operation is edited such that the first MPEG picture data is reproduced to the position g first, and then the re-encoded MPEG picture data of the section A+B is reproduced, and the data is connected to the point j of the second MPEG picture data and the data is reproduced. Based on this connection reproduction operation, it becomes possible to realize a seamless connection reproduction having the same contents as the original first and second MPEG picture data, without generating a contradiction at the VBV buffers.

Next, there will be explained in detail below a recording structure of the VBV buffer information (VBV buffer occupation value relevant information that shows an information value relating to a VBV buffer occupation value at an MPEG encoding starting point in time or an end point in time of a last picture in each predetermined section of the MPEG picture data, and address information that shows a position of the VBV buffer occupation value relevant information in the MPEG picture data), and the MPEG picture data that are to be recorded onto a recording medium by a recording and reproducing apparatus according to one embodiment of the present invention.

The following is a detailed explanation of the explanation already made with reference to FIG. 7 to FIG. 10, with additional reference to further drawings. Therefore, there is some duplicated description.

A recording medium is recorded with an MPEG picture data that is a picture data compressed according to an MPEG encoding system. This MPEG picture data is recorded as a bit stream of a plurality of continuous data that have been generated by encoding in a one-time recording unit and that can be reproduced continuously.

Separate from the bit stream of the encoded MPEG picture data, the recording medium is recorded with a VBV buffer value (an occupation value) at an end point in time of encoding of a picture one frame before an I picture, a VBV buffer value (an occupation value) at an end point in time of encoding of a picture one frame before a P picture, and a VBV buffer value (an occupation value) at an end point in time of recording, in the bit stream of the MPEG picture data respectively, and address information that shows an address of the position of each VBV buffer occupation value in the MPEG picture data (in this case, a relative address from the start of the file of the MPEG picture data). FIG. 7 shows a data structure of the VBV buffer information including these data.

The VBV buffer information has a hierarchical structure. First, there is an entry point information structure unit, and thereafter, there is a VBV information structure unit. The entry point information structure unit first describes a number of addresses of entry points (EP) in 32 bits, and then sequentially describes EPn addresses (where n is a natural number of 1 or above) in 32 bits. The EPn addresses show positions where the EPn information (where n is a natural number of 1 or above) of the VBV information structure unit is described. The EPn addresses are relative addresses from the header of the VBV buffer information. On the other hand, the VBV information structure unit describes the EP information starting from the EP1 information. The EP1 information includes a relative address, a PTM value, and a VBV value in this order.

The relative addresses in the EPn information of the VBV information structure unit are the relative addresses of an end point in time of encoding of a picture one frame before an I picture, an end point in time of encoding of a picture one frame before a P picture, and an end point in time of recording, from the header of the MPEG picture data in the bit stream of the MPEG picture data respectively, as shown in FIG. 8. The relative addresses use a byte as a unit, for example. When the data are recorded on a disk medium, sectors are used as the relative addresses.

The PTM value in the EPn information of the VBV information structure unit is a time stamp recorded in a clock of 90 KHz or 27 MHz in the MPEG system standard (multiplexing standard). In the MPEG standard, this time stamp is called a PTS (Presentation Time Stamp) or a DTS (Decoding Time Stamp). In the present example, the DTS is recorded as the time information of an end point in time of encoding of a picture one frame before an I picture, and an end point in time of encoding of a picture one frame before a P picture, in the bit stream of the MPEG picture data respectively. The DTS is recorded by one for one picture. In the case of a video signal of the NTSC, the DTS is recorded at intervals of 3,003 clocks for one picture in 90 KHz. Therefore, when either an I picture or a P picture exists for each three pictures like in the case of the present invention, and also when the clock starts with zero at the beginning, the PTM information is described in the EPn information at intervals of 9,009, 18,018, and so on.

The VBV value in the EPn information of the VBV information structure unit is a value of occupation of a virtual buffer in a decoder prescribed in the MPEG. The VBV value can be obtained by calculation from a generated amount of code for each one picture in the MPEG picture data and a value of a transfer rate. As shown in FIG. 9, there are described VBV occupation values at an end point in time of encoding of a picture one frame before an I picture, and an end point in time of encoding of a picture one frame before a P picture, (at each position of a ○ mark shown in FIG. 9) respectively in the compressed bit stream information. Alternatively, there are described $VBV_{delay}$ values prescribed in the MPEG at the each point. These $VBV_{delay}$ values are the values that show how much time is required to reach the respective VBV occupation values at the then transfer rate. In the present invention, the VBV values may be any values so long as the values are the information relating to values of occupation of a VBV buffer.

Figure 15:
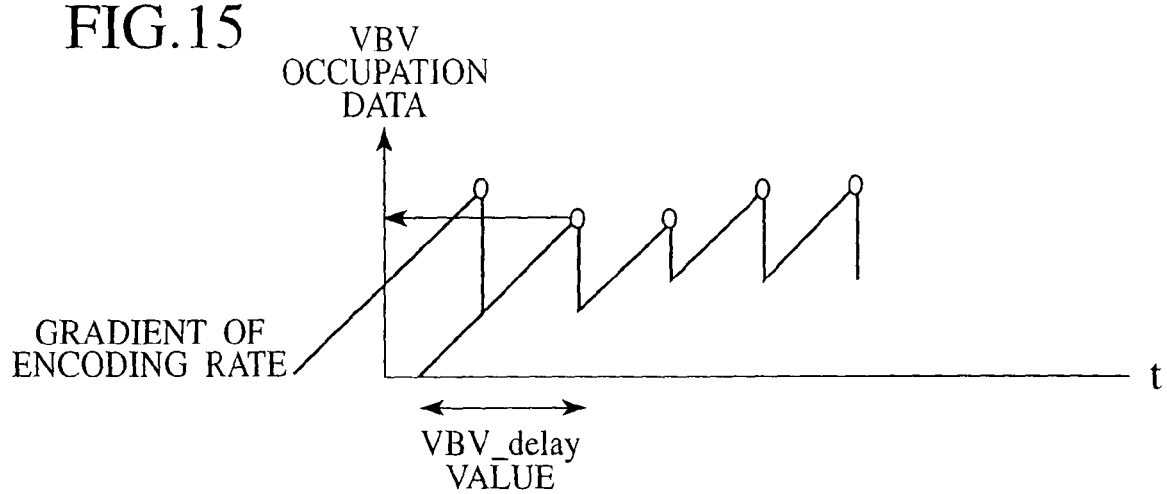
FIG. 15 is a diagram showing a relationship between a value of occupation of a VBV buffer and a $VBV_{delay}$ value.

FIG. 15 shows a relationship between the VBV buffer occupation value and the $VBV_{delay}$ value. An occupation value OCC of the VBV buffer has a relationship of $VBV_{delay}=90,000 \times OCC/R$, where R represents an encoding rate. The value 90,000 is a value of a count number of 90 KHz.

In the MPEG compression, basically, the encoding is executed using a picture type of I or P in the unit of three frames like IBB and PBB. In the MPEG compression, there is a possibility that a B picture is predicted from both directions. Therefore, in the sequence of an encoded bit stream, it is not possible to additionally connect data except at only an end point in time of encoding of a picture one frame before an I picture, and at an end point in time of encoding of a picture one frame before a P picture of the bit stream. Consequently, in the present invention, the description is made based on the assumption that the VBV information is described at an end point in time of encoding of a picture one frame before an I picture, and at an end point in time of encoding of a picture one frame before a P picture in the bit stream.

Figure 16A:
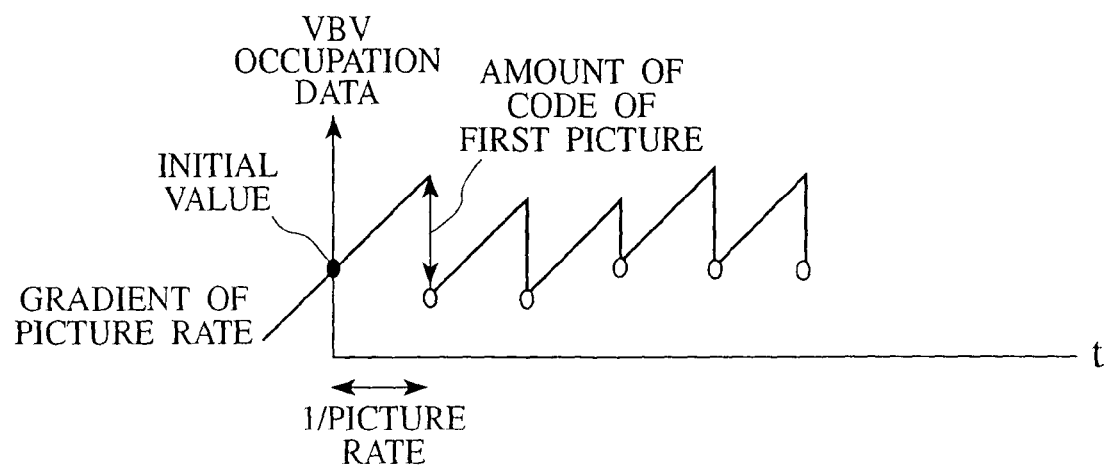
FIGS. 16A and 16B are diagrams for explaining an information value relating to a value of occupation of a VBV buffer according to one embodiment of the present invention.
Figure 16B:
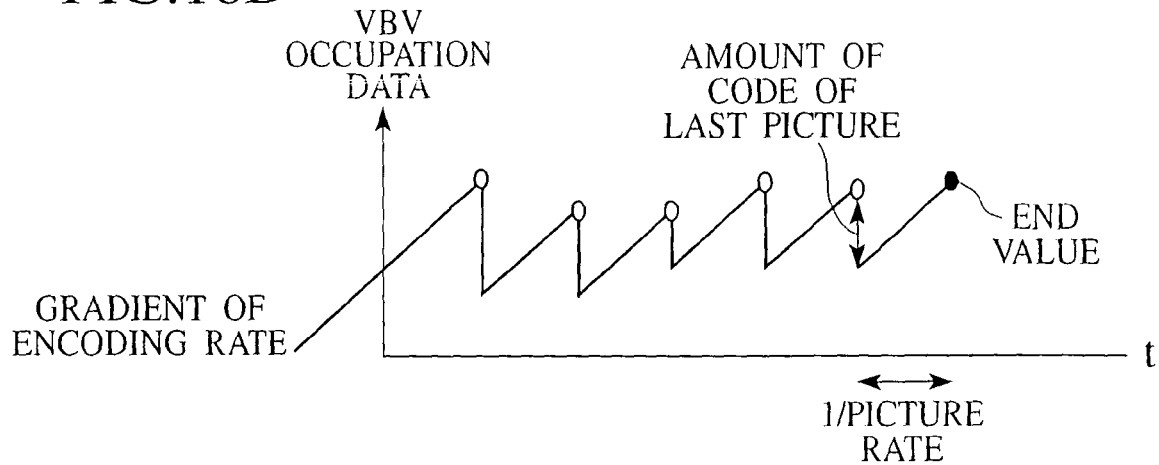

However, in principle, there may be an information value relating to the VBV occupation value for each picture. This information may be at the encoding starting point of the picture instead of the encoding end point of the picture. FIG. 16A is a concept diagram showing a case where the values of the encoding end points are held in the list. In this case, there is no information value relating to a first VBV occupation value. Therefore, it is assumed that there is a virtual frame before the first frame, and an information value relating to the VBV occupation value at the encoding end point in time of this virtual frame is obtained by calculation as an initial value. This calculation is carried out as follows. First, the amount of code of a first picture is added to the information value relating to the first VBV occupation value. From this added value, a transmission amount of code during a time of 1/picture-rate calculated based on a gradient of an encoding rate is subtracted. As a result, the initial value as indicated by a black circle portion in FIG. 16A is obtained. FIG. 16B is a concept diagram showing a case where the values of the encoding starting points are held in the list. In this case, there is no information value relating to a last VBV occupation value. Therefore, it is assumed that there is a virtual frame after the last frame, and an information value relating to the VBV occupation value at the encoding starting point in time of this virtual frame is obtained by calculation as an end value. This calculation is carried out as follows. First, the amount of code of a last picture is subtracted from the information value relating to the last VBV occupation value. To this subtracted value, a transmission amount of code during a time of 1/picture-rate calculated based on a gradient of an encoding rate is added. As a result, the end value as indicated by a black circle portion in FIG. 16B is obtained.

Next, FIG. 10 shows a structure of a recording and reproducing apparatus according to one embodiment of the present invention. The operation of preparing the VBV buffer information while encoding a picture data according to the MPEG encoding system will be explained below with reference to FIG. 10.

In a status that there is no encoded data in a recording medium 31 at all, that is, when data is to be encoded for the first time, a data reading section 32 for reading data from the recording medium 31 has no data. Therefore, the data reading section 32 transmits information to show that there is no data, to a VBV buffer information detector 33. As the VBV buffer information detector 33 does not have data either, a preset initial value has been set in advance to a parameter setter 34. For example, the VBV value is set as a value of 80% of a maximum value of the VBV prescribed in the MPEG, and the PTM time stamp information is set as zero. The parameter setter 34 transmits these initial set values to a picture encoder 35.

The picture encoder 35 starts the encoding starting from the initial set values. While executing the encoding, the picture encoder 35 transmits a generated amount of code, a PTM value, and a VBV value at an end point in time of encoding of a picture one frame before an I picture, and at an end point in time of encoding of a picture one frame before a P picture in the bit stream, to a VBV buffer information generator 36 each time. At the same time, the picture encoder 35 transmits an encoded data to a data writing section 37. Further, the picture encoder 35 transmits to the VBV buffer information generator 36, a generated amount of code, a PTM value, and a VBV value at a point of time when a user has temporarily stopped or ended a compressed recording of a picture.

Figure 1:
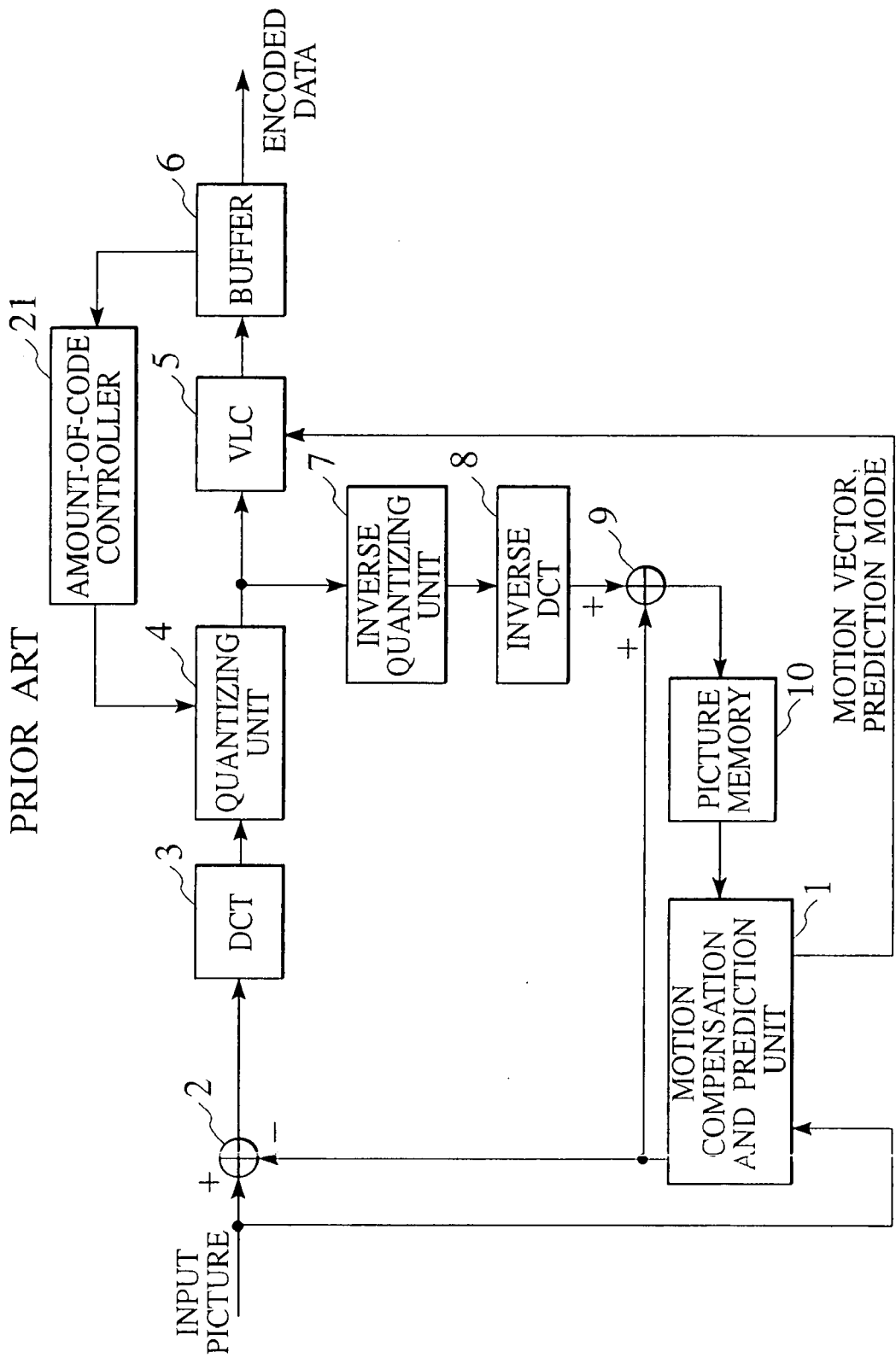
FIG. 1 is a diagram showing one example of a conventional MPEG encoder.
Figure 2:
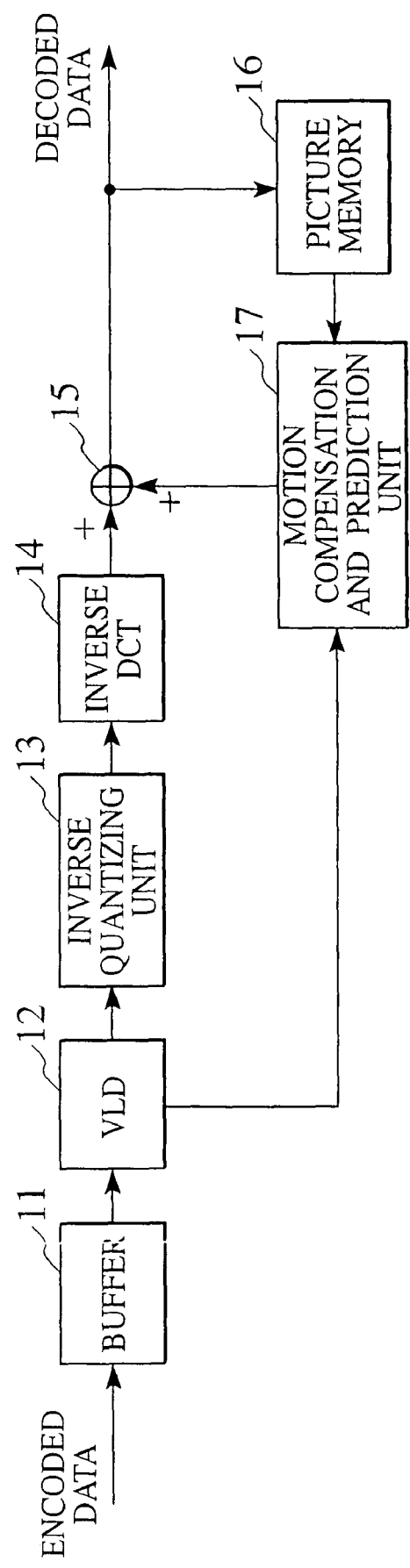
FIG. 2 is a diagram showing another example of a conventional MPEG decoder.
Figure 3:
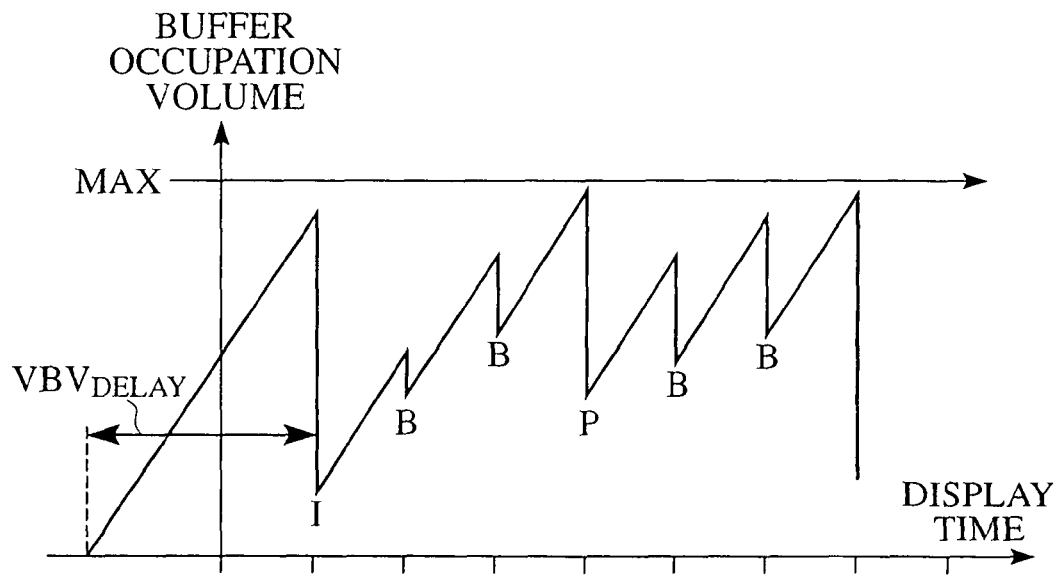
FIG. 3 is a diagram for explaining the concept of a VBV buffer in the MPEG.
Figure 4:
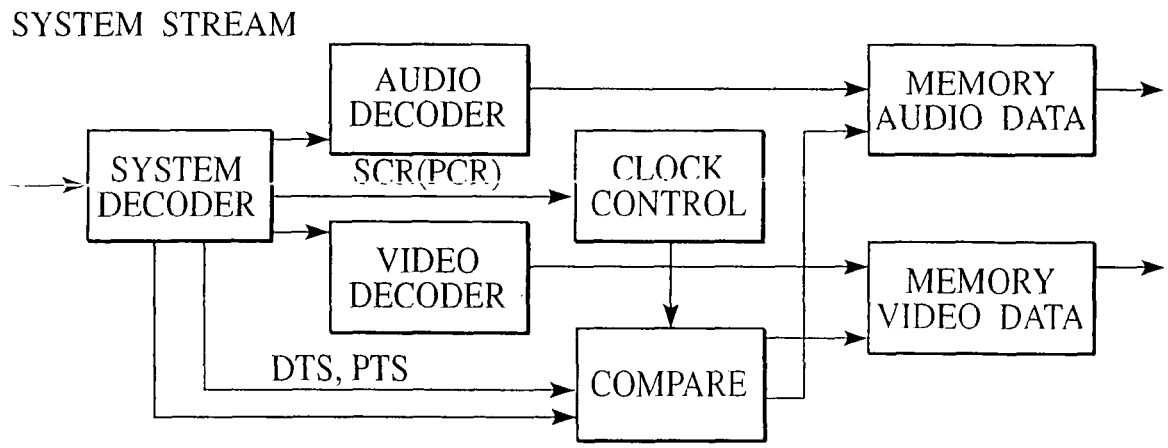
FIG. 4 is an explanatory diagram showing a conventional MPEG multiplexing system.
Figure 5:
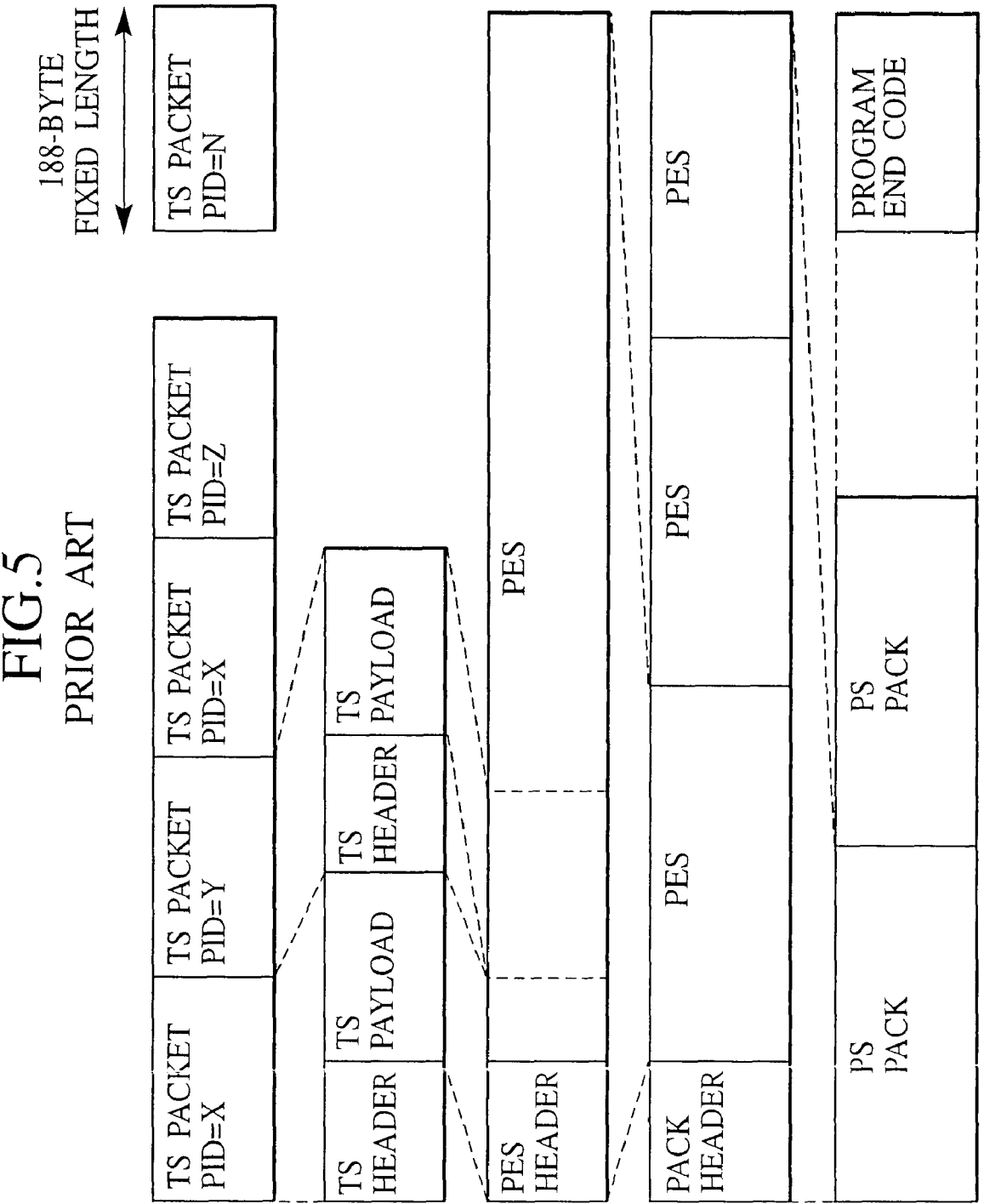
FIG. 5 is an explanatory diagram showing a relationship between the MPEGTS, the PS, and the PES.
Figure 6:
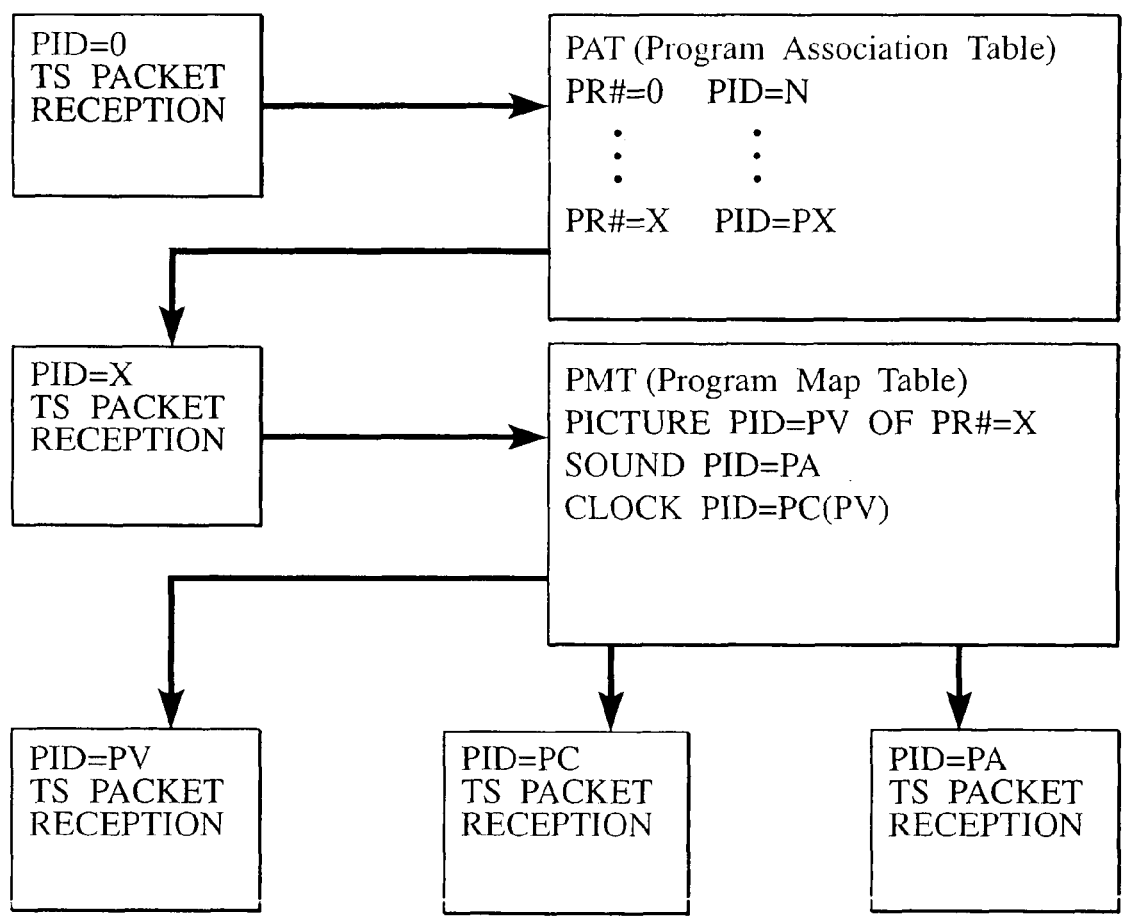
FIG. 6 is an explanatory diagram showing an example of the use of the MPEGTS and the PSI.

The VBV buffer information generator 36 generates a data of VBV buffer information of a structure shown in FIG. 1 from a generated amount of code, a PTM value, and a VBV value that have been input. Alternatively, the VBV buffer information generator 36 memories a data necessary for generating this data structure, and records and stores this data in a predetermined format. The information generated by the VBV buffer information generator 36 may be written in burst at the same time when the encoded data (the MPEG picture data) is being written onto the recording medium 31 by the data writing section 37. Further, the information generated by the VBV buffer information generator 36 may be transformed from the data recorded and held in the predetermined format into the structure shown in FIG. 7, and written onto the recording medium 31 by the data writing section 37, after the writing of the encoded data (the MPEG picture data) has been finished, or after the user has temporarily stopped or ended a compressed recording of a picture.

Next, the operation of re-encoding the portion of the section A for making it possible to execute a connection reproduction from a predetermined position to the two MPEG picture data of the first and second MPEG picture data that have already been recorded onto the recording medium 31 will be explained.

First, at a user interface not shown, the user specifies any one point of the first and second MPEG picture data already recorded from which the connection reproduction is to be started.

The recording medium 31 has already been recorded with the two MPEG picture data of the first and second MPEG picture data (a compression encoded stream) and the VBV buffer information generated by the recording and reproducing apparatus shown in FIG. 10. Therefore, the data reading section 32 reads the VBV buffer information, and obtains a VBV value, a PTM value, and relative addresses at a position a before a connection point b (an specified connection position) by the length of the section A in FIG. 11.

When position information of a relative address of the data is specified as the connection reproduction position from the user interface, the VBV value and the PTM value linked to the data of a value nearest the relative address information within the EPn information of the VBV buffer information structure are used. When a time from the starting time of the data or time stamp information of a point from which the connection reproduction of the MPEG picture data is to be started is specified, the PTM value within the EPn information of the VBV buffer information structure is used in a similar manner. When this value has been recorded in the clock of 90 KHz, this value is multiplied by a value of a 1/90,000 second, thereby to be able to obtain a time in the order of a second. It is also possible to obtain a position (a relative address) for the connection recording to be executed, the VBV value, and the PTM value.

These values are input to the parameter setter 34. Then, the picture encoder 35 starts the encoding from the set value. In the mean time, an encoded data searcher 38 searches the bit stream already recorded for a header position of the section A to be re-encoded. In this searching, a relative address of the data is used, and a pointer is set to a position from the header of the bit stream file.

The picture encoder 35 decodes the first MPEG picture data corresponding to the section A, and executes the re-encoding again using the decoded picture according to the MPEG encoding system while controlling the rate such that a transition of the VBV buffer occupation value starts from the VBV value at the position a and ends with the VBV value at a position d. The re-encoding may be carried out using the completely decoded picture as described above, or may be carried out by using a technique of controlling the amount of code on the bit stream as disclosed in Japanese Patent Application Laid-open Publication No. 11-234677.

When the section A to be re-encoded is longer than a minimum unit of the VBV buffer information, the picture encoder 35 transmits a generated amount of code, a PTM value, and a VBV value at an end point in time of encoding of a picture one frame before an I picture, and at an end point in time of encoding of a picture one frame before a P picture in the bit stream, to a VBV buffer information generator 36 each time, while executing the encoding. At the same time, the picture encoder 35 transmits a re-encoded data to a data writing section 37.

The VBV buffer information generator 36 generates a data of VBV buffer information of a structure shown in FIG. 7 from a generated amount of code, a PTM value, and a VBV value that have been input. Alternatively, the VBV buffer information generator 36 memories a data necessary for generating this data structure, and records and stores this data in a predetermined format. The information generated by the VBV buffer information generator 36 may be written in burst at the same time when the encoded data is being written. Further, the information generated by the VBV buffer information generator 36 may be transformed from the data recorded and held in the predetermined format into the structure shown in FIG. 7, and written, after the writing of the encoded data has been finished, or after the user has temporarily stopped or ended a compressed recording of a picture.

The picture data of the re-encoded section A (the re-encoded data in the connection section A) is recorded in a file separate from the file for the first and second MPEG picture data. Alternatively, the picture data of the re-encoded section A is recorded linked to the header of the recorded second MPEG picture data.

The first MPEG picture data, the second MPEG picture data, the information relating to the VBV buffer occupation value and its data address information, and the re-encoded picture data of the section A (or the re-encoded picture data of the section B, or the re-encoded picture data of the sections A+B) may be recorded on the same recording medium, or may be recorded on a plurality of recording media based on optional combinations, or may be recorded on mutually different recording media. When these kinds of information are separately recorded on a plurality of recording media, it is preferable to record the information like ID that indicates the same information group onto each recording medium so that each recording medium is applied by being linked to each other (in other words, data and information is linked to each other). When the first MPEG picture data, the second MPEG picture data, and the re-encoded picture data of the section A (or the re-encoded picture data of the section B, or the re-encoded picture data of the sections A+B) are recorded on the same recording medium, it is possible to control the connection reproduction at the reproducing unit side by using one recording medium.

In the above embodiment; the recording medium has been explained as a recording medium within the recording and reproducing apparatus. However, this recording medium may be a recording medium that is mountable and dismountable to/from the recording and reproducing apparatus, or a recording medium (a database) via a network.

Further, in the above embodiment, an example has been explained of the case where picture data as a single unit MPEG picture data is connected with each other. However, it is also possible to apply the invention to the case where MPEG picture data within an MPEG transport stream as MPEG multiplexed data that has been packet-multiplexed with sound data according to the MPEG encoding system is connected with each other.

In many cases, the transport stream is multiplexed with variable-length encoded MPEG picture data, or fixed-length encoded MPEG 1 layer 2 audio or AC3. Therefore, in the case of connecting MPEG picture data as one of element encoded data in the multiplexed data, it is preferable to apply the explained method of the embodiment as a connection method that takes into account the consistency of the STD buffer (VBV buffer in the case of video) that has been prescribed in the MPEG for the connection point.

For example, the first and second MPEG picture data to be connected are extracted from the first and second MPEG transport streams respectively, and they are connected with each other in a similar manner to that explained in the above embodiment. The re-encoded data of the connection section to be used for the connection reproduction (the re-encoded picture data of the section A, the re-encoded picture data of the section B, or the re-encoded picture data of the sections A+B) may be generated and recorded as the MPEG multiplexed data that has been packet-multiplexed according to the MPEG encoding system.

Figure 17:
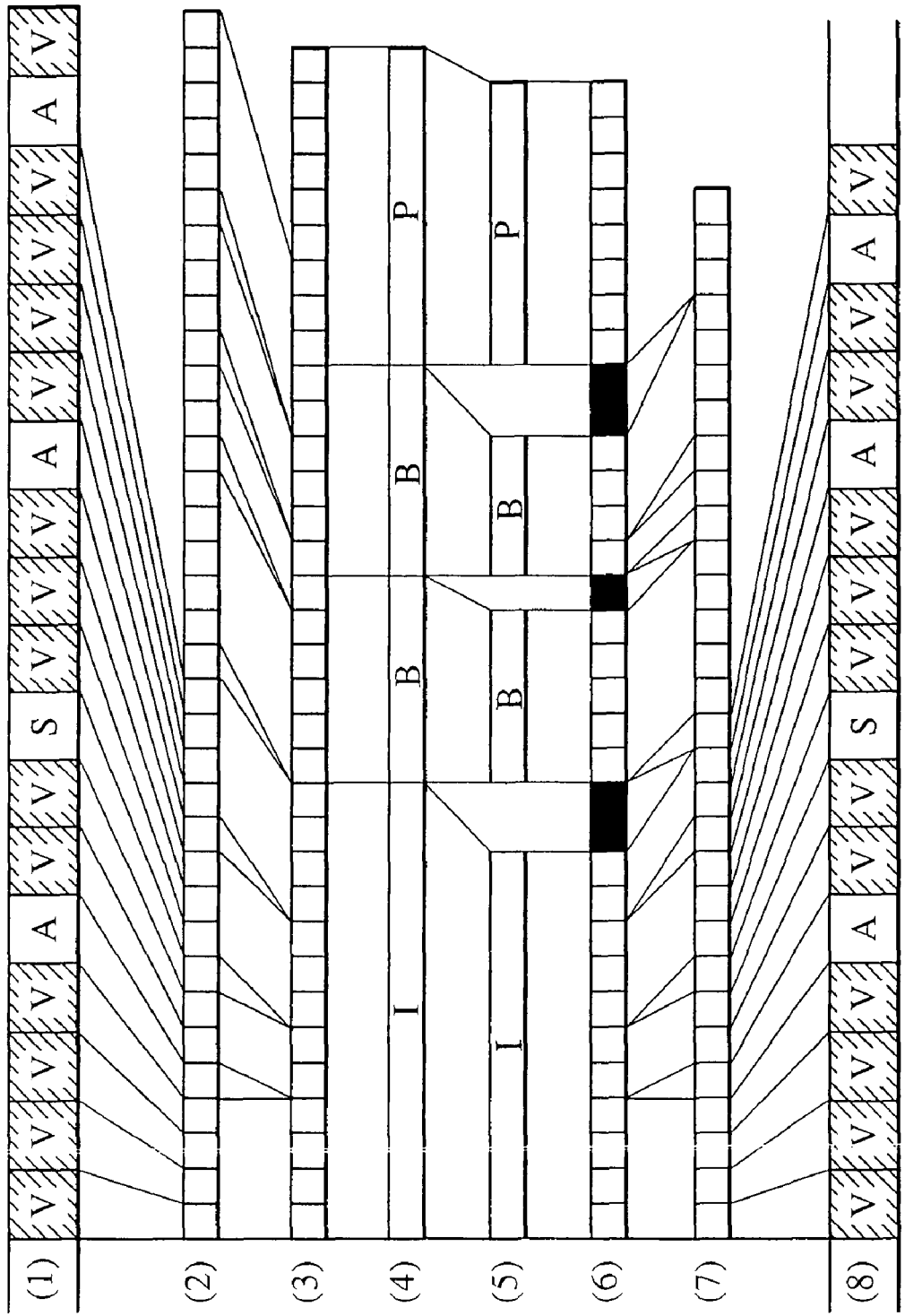
FIG. 17 is an explanatory diagram showing a layout of MPEGTS packets.

Referring to FIG. 17, (1) shows a state of data that has been packet-multiplexed in the MPEG transport stream. A packet expressed as V represents a video packet. A packet expressed as A represents an audio packet. A packet expressed as S represents an information packet like PAT and PMT that are used in the system. These packets are recorded based on the rule of the MPEG2. The video packets are provided with shaded lines. In FIG. 17, (2) shows a state of the total packets. In FIG. 17, (3) shows a state of the collection of only the video packets. As shown in (4) in FIG. 17, the video packets include first one I picture, then two B pictures, and one P picture in the last, as a representative example.

One or a plurality of pictures among these pictures are re-encoded to adjust the amount of code. For example, (5) in FIG. 17 shows a state that the amount of code has been decreased. The amount of code of each picture has been made small. The picture data that has been expressed in packets in this state is shown in (6) in FIG. 17. The decreased portions are filled in black. The total amount of video is decreased by this portion of the packets. Then, the TS is restructured. The total state is expressed in (7) in FIG. 17. The enlarged state of (7) in FIG. 17 is expressed in (8) in FIG. 17. As a result, a part of the V packets is decreased, and other element data packets are multiplexed directly.

According to the prescription of the MPEG, the PCR clock information must be recorded once at every 100 msec. Further, as the data length has been changed, the PCR clock information described in each element packet is changed when necessary. The video packet is described with PTS and DTS in the packet where the PES header of an access unit (a picture unit of a frame and a field) exists. The audio packet is described with PTS in the packet where the PES header having one or a plurality of audio frames packed with PES exist. These kinds of time stamp information do not need to be changed when the number of pictures has not been increased or decreased. The audio data does not need to be changed either when the reproduction time has not been increased or decreased. In other cases, PTS and DTS are additionally corrected suitably.

Further, in the case of simply executing a re-encoding, the GOP unit from the I picture as a reset timing of predictive encoding is easy to handle. However, when the GOP is not independent, that is, when the B picture at the boundary is predicted to stride over both GOPs (when closed#gop=0 for GOP), it is necessary to decode a last reference picture of one GOP before, and to hold the decoded result in a picture re-encoding memory not shown.

The first MPEG multiplexed data (the first MPEG transport stream), the second MPEG picture data (the second MPEG transport stream), the information relating to the VBV buffer occupation value and its data address information, and the connection section MPEG multiplexed data that includes the re-encoded picture data of the section A (or the re-encoded picture data of the section B, or the re-encoded picture data of the sections A+B) and that has been generated by packet-multiplexing according to the MPEG may be recorded on the same recording medium, or may be recorded on a plurality of recording media based on optional combinations, or may be recorded on mutually different recording media. When these kinds of information are separately recorded on a plurality of recording media, it is preferable to record the information like ID that indicates the same information group onto each recording medium so that each recording medium is applied by being linked to each other (in other words, data and information is linked to each other). When the first MPEG multiplexed picture data, the second MPEG multiplexed picture data, and the connection section MPEG multiplexed data of the re-encoded picture data of the section A (or the re-encoded picture data of the section B, or the re-encoded picture data of the sections A+B) are recorded on the same recording medium, it is possible to control the connection reproduction at the reproducing unit side by using one recording medium.

As explained above, according to the present invention, it is possible to reproduce seamless and high-definition MPEG picture data when a new MPEG picture data is additionally recorded in the middle or at the end of an MPEG picture data that has already been recorded, without generating a contradiction of an overflow or an underflow in the connection of VBV buffers during a reproduction time. Further, according to the present invention, it is possible to identify a starting value of a VBV buffer occupation value at a starting point of an MPEG picture data that is to be additionally recorded, without a need for decoding an MPEG picture data that has already been recorded, and it is also possible to reduce a size of a circuit scale and reduce a calculation time for the additional recording.

Further, according to the present invention, it is possible to realize a reproduction of seamless and high-definition MPEG picture data when two MPEG picture data of a first MPEG picture data and a second MPEG picture data (or a packet-multiplexed first MPEG multiplexed data including a first MPEG picture data as an element encoded data, and a packet-multiplexed second MPEG multiplexed data including a second MPEG picture data as an element encoded data) are reproduced by connecting the first MPEG picture data to the second MPEG picture data (or by connecting the first MPEG multiplexed data to the second MPEG multiplexed data) at respective specified connection positions, without generating a contradiction of an overflow or an underflow in the connection of VBV buffers during a reproduction time.

Further, according to the MPEG picture data recording apparatus and the MPEG picture data generating apparatus of the present invention, only a re-encoded data of a set connection section is sufficient as the picture data to be newly generated for realizing the seamless and high-definition reproduction. Therefore, it is possible to efficiently utilize the recording medium for recording the re-encoded data of the connection section.

Further, according to the MPEG picture data recording apparatus and the MPEG picture data generating apparatus of the present invention, it is possible to obtain a starting value and an end value of the information value relating to the VBV buffer occupation value at the time of generating the connection section re-encoded data, without the need for decoding the two MPEG picture data of the first and second MPEG picture data. Therefore, it is possible to reduce a size of a circuit scale and reduce a calculation time.

It should be understood that many modifications and adaptations of the invention will become apparent to those skilled in the art and it is intended to encompass such obvious modifications and changes in the scope of the claims appended hereto.

What is claimed is:

1. An MPEG picture data reproducing apparatus, for reproducing MPEG picture data as a picture data encoded according to the MPEG encoding system, the MPEG picture data reproducing apparatus comprising:
connectively reproducing means for obtaining a connection section re-encoded data that has been encoded according to an MPEG encoding system as a data for reproducing two MPEG picture data of a first MPEG picture data and a second MPEG picture data by connecting the first MPEG picture data to the second MPEG picture data at specified connection positions specified in the respective MPEG picture data, and then connectively reproducing the first MPEG picture data and the second MPEG picture data, wherein, the connection section re-encoded data is re-encoded data generated by re-encoding the connection section decoded picture data as a picture data obtained by decoding the first MPEG picture data in the connection section, according to the MPEG encoding system, by executing the re-encoding while controlling the amount of code such that a transition of the information value relating to the VBV buffer occupation value at the time of the re-encoding starts from the information value relating to the VBV buffer occupation value at the time of encoding the first MPEG picture data at a position corresponding to a starting position of the connection section and ends with the information value relating to the VBV buffer occupation value at the time of encoding the second MPEG picture data at a position corresponding to the specified connection position in the second MPEG picture data, wherein the connection section is a section from a position located a predetermined time before the specified connection position in the first MPEG picture data as the starting position to the specified connection position in the first MPEG picture data as an end position, and the connectively reproducing means reproduces the first MPEG picture data to the starting position of the connection section, and then reproduces the connection section re-encoded data from the starting position of the connection section to the end position thereof, and then reproduces the second MPEG picture data from the specified connection position in the second MPEG picture, wherein the first MPEG picture data is picture data obtained from a first MPEG multiplexed data that includes the first MPEG picture data as an element encoded data and that has been generated by being packet-multiplexed according to the MPEG encoding system, the second MPEG picture data is picture data obtained from a second MPEG multiplexed data that includes the second MPEG picture data as an element encoded data and that has been generated by being packet-multiplexed according to the MPEG encoding system, and the connection section re-encoded data is picture data obtained from a connection section MPEG multiplexed data that includes the connection section re-encoded data as an element encoded data and that has been generated by being packet-multiplexed according to the MPEG encoding system.

* * * * *